(12) United States Patent
Olmeijer

(10) Patent No.: US 11,407,937 B2
(45) Date of Patent: Aug. 9, 2022

(54) IN-SITU CROSS-LINKING OF EMULSIFIED QUANTUM DOT-CONTAINING DOMAINS WITHIN A CARRIER RESIN

(71) Applicant: NANOSYS, INC., Milpitas, CA (US)

(72) Inventor: David Olmeijer, San Francisco, CA (US)

(73) Assignee: Nanosys, Inc., Milpitas, CA (US)

( * ) Notice: Subject to any disclaimer, the term of this patent is extended or adjusted under 35 U.S.C. 154(b) by 515 days.

(21) Appl. No.: 15/975,809

(22) Filed: May 10, 2018

(65) Prior Publication Data

US 2018/0327660 A1 Nov. 15, 2018

Related U.S. Application Data

(60) Provisional application No. 62/504,156, filed on May 10, 2017.

(51) Int. Cl.
| | |
|---|---|
| C09K 11/02 | (2006.01) |
| C08L 75/04 | (2006.01) |
| C08J 3/24 | (2006.01) |
| C09K 11/08 | (2006.01) |
| B82Y 40/00 | (2011.01) |
| B82Y 20/00 | (2011.01) |

(52) U.S. Cl.
CPC ............ C09K 11/025 (2013.01); C08J 3/246 (2013.01); C08L 75/04 (2013.01); C09K 11/02 (2013.01); C09K 11/08 (2013.01); *B82Y 20/00* (2013.01); *B82Y 40/00* (2013.01); *C08L 2205/03* (2013.01); *C08L 2312/08* (2013.01)

(58) Field of Classification Search
CPC .................................................. C09K 11/025
See application file for complete search history.

(56) References Cited

U.S. PATENT DOCUMENTS

| | | | |
|---|---|---|---|
| 5,505,928 | A | 4/1996 | Alivisatos et al. |
| 6,207,229 | B1 | 3/2001 | Bawendi et al. |
| 6,225,198 | B1 | 5/2001 | Alivisatos et al. |
| 6,306,736 | B1 | 10/2001 | Alivisatos et al. |
| 6,322,901 | B1 | 11/2001 | Bawendi et al. |
| 6,576,291 | B2 | 6/2003 | Bawendi et al. |
| 6,607,829 | B1 | 8/2003 | Bawendi et al. |
| 6,788,453 | B2 | 9/2004 | Banin et al. |
| 6,821,337 | B2 | 11/2004 | Bawendi et al. |
| 6,861,155 | B2 | 3/2005 | Bawendi et al. |

(Continued)

OTHER PUBLICATIONS

Gelest. Safety Data Sheet AMS-242: (3-5% aminoethylaminoisobutylmethylsiloxane)-dimethylsiloxane copolymer. retrieved from https://s3.amazonaws.com/gelest/sds/AMS-242_GHS+US_English+US.pdf on Feb. 26, 21. Initially published in 2014. (Year: 2014).*

(Continued)

*Primary Examiner* — Matthew E. Hoban
(74) *Attorney, Agent, or Firm* — Sterne, Kessler, Goldstein & Fox P.L.L.C.

(57) ABSTRACT

The present invention provides quantum dot compositions and methods of producing quantum dot compositions. The quantum dot compositions comprise a population of quantum dots, an aminosilicone polymer, an epoxy-functional silicone, and an organic resin. The present invention also provides quantum dot films comprising a quantum dot layer and methods of making quantum dot films.

25 Claims, 1 Drawing Sheet

(56) References Cited

U.S. PATENT DOCUMENTS

| | | | |
|---|---|---|---|
| 6,949,206 | B2 | 9/2005 | Whiteford et al. |
| 7,060,243 | B2 | 6/2006 | Bawendi et al. |
| 7,125,605 | B2 | 10/2006 | Bawendi et al. |
| 7,138,098 | B2 | 11/2006 | Bawendi et al. |
| 7,267,875 | B2 | 9/2007 | Whiteford et al. |
| 7,374,807 | B2 | 5/2008 | Parce et al. |
| 7,374,824 | B2 | 5/2008 | Bawendi et al. |
| 7,557,028 | B1 | 7/2009 | Scher et al. |
| 7,566,476 | B2 | 7/2009 | Bawendi et al. |
| 7,572,393 | B2 | 8/2009 | Whiteford et al. |
| 7,645,397 | B2 | 1/2010 | Parce et al. |
| 8,062,967 | B1 | 11/2011 | Scher et al. |
| 8,101,234 | B2 | 1/2012 | Bawendi et al. |
| 8,158,193 | B2 | 4/2012 | Bawendi et al. |
| 8,282,412 | B1 | 10/2012 | Yaguchi et al. |
| 8,563,133 | B2 | 10/2013 | Whiteford et al. |
| 8,618,212 | B2 | 12/2013 | Liu et al. |
| 9,169,435 | B2 | 10/2015 | Guo et al. |
| 2007/0185261 | A1 | 8/2007 | Lee et al. |
| 2008/0090947 | A1 | 4/2008 | Shin et al. |
| 2008/0237540 | A1 | 10/2008 | Dubrow |
| 2008/0281010 | A1 | 11/2008 | Lefas et al. |
| 2010/0110728 | A1 | 5/2010 | Dubrow et al. |
| 2011/0262752 | A1 | 10/2011 | Bawendi et al. |
| 2011/0263062 | A1 | 10/2011 | Bawendi et al. |
| 2013/0043433 | A1* | 2/2013 | Liu .................. H01L 31/055 252/500 |
| 2015/0236195 | A1 | 8/2015 | Guo et al. |

OTHER PUBLICATIONS

Lee. Curing Kinetics and Viscosity Change of a Two-Part Epoxy Resin During Mold Filling in Resin-Transfer Molding Process. Journal of Applied Polymer Science, vol. 77, 2139-2148 (2000) (Year: 2000).*

Battaglia, D. and Peng, X., "Formation of High Quality InP and InAs Nanocrystals in a Noncoordinating Solvent," *Nano Letters* 2(9):1027-1030, American Chemical Society, United States (2002).

Borchert, H., et al., "Investigation of ZnS Passivated InP Nanocrystals by XPS," *Nano Letters* 2(2):151-154, American Chemical Society, United States (2002).

Cros-Gagneux, A., et al., "Surface Chemistry of InP Quantum Dots: A Comprehensive Study," *J. Am. Chem. Soc.* 132:18147-18157, American Chemical Society, United States (2010).

Guzelian, A.A., et al., "Colloidal chemical synthesis and characterization of InAs nanocrystal quantum dots," *Appl. Phys. Lett.* 69(10):1432-1434, American Institute of Physics, United States (1996).

Guzelian, A.A., et al., "Synthesis of Size-Selected, Surface-Passivated InP Nanocrystals," *J. Phys. Chem.* 100:7212-7219, American Chemical Society, United States (1996).

Haubold, S., et al., "Strongly Luminescent InP/ZnS Core-Shell Nanoparticles," *ChemPhysChem* 5:331-334, Wiley-VCH-Verlag GmbH, Germany (2001).

Hussain, S., et al, "One-Pot Fabrication of High-Quality InP/ZnS (Core/Shell) Quantum Dots and Their Application to Cellular Imaging," *ChemPhysChem* 10:1466-1470, Wiley-VCH Verlag GmbH, Germany (2009).

Kim, S., et al., "Highly Luminescent InP/GaP/ZnS Nanocrystals and Their Application to White Light-Emitting Diodes," *J. Am. Chem. Soc.* 134:3804-3809, American Chemical Society, United States (2012).

Li, L., et al. "Economic Synthesis of High Quality InP Nanocrystals Using Calcium Phosphide as the Phosphorus Precursor," *Chem. Mater.* 20:2621-2623, American Chemical Society, United States (2008).

Li, L. and Reiss, P., "One-pot Synthesis of Highly Luminescent InP/ZnS Nanocrystals without Precursor Injection," *J. Am. Chem. Soc.* 130:11588-11589, American Chemical Society, United States (2008).

Lim, J., et al., "InP@ZnSeS, Core@Composition Gradient Shell Quantum Dots with Enhanced Stability," *Chemistry of Materials* 23:4459-4463, American Chemical Society, United States (2011).

Liu, Z., et al., "Coreduction Colloidal Synthesis of III-V Nanocrystals: The Case of InP," *Angew. Chem. Int. Ed.* 47:3540-3542, Wiley-VCH Verlag GmbH & Co, Germany (2008).

Lucey, D.W., et al., "Monodispersed InP Quantum Dots Prepared by Colloidal Chemistry in a Noncoordinating Solvent," *Chem. Mater.* 17:3754-3762, American Chemical Society, United States (2005).

Mićić, O.I., et al., "Synthesis and characterization of InP, GaP, and GaInP$_2$ quantum dots," *J. Phys. Chem.* 99:7754-7759 (1995).

Mićić, O. I., et al., "Size-Dependent Spectroscopy of InP Quantum Dots," *J. Phys. Chem. B* 101:4904-4912, American Chemical Society, United States (1997).

Mićić, O. I., et al., "Core-Shell Quantum Dots of Lattice-Matched ZnCdSe$_2$ Shells on InP Cores: Experiment and Theory," *J. Phys. Chem. B* 104:12149-12156, American Chemical Society, United States (2000).

Nann, T., et al., "Water Splitting by Visible Light: A Nanophotocathode for Hydrogen Production," *Angew. Chem. Int. Ed.* 49:1574-1577, Wiley-VCH Verlag GmbH & Co., Germany (2010).

Wells, R.L., et al., "Use of Tris(trimethylsilyl)arsine to Prepare Gallium Arsenide and Indium Arsenide," *Chemistry of Materials* 1(1):4-6, American Chemical Society, United States (1989).

Xie, R., et al., "Colloidal InP Nanocrystals as Efficient Emitters Covering Blue to Near-Infrared," *J. Am. Chem. Soc.* 129:15432-15433, American Chemical Society, United States (2007).

Xu, S., et al., "Rapid Synthesis of High-Quality InP Nanocrystals," *J. Am. Chem. Soc.* 128:1054-1055, American Chemical Society, United States (2006).

Zan, F., et al., "Experimental Studies on Blinking Behavior of Single InP/ZnS Quantum Dots: Effects of Synthetic Conditions and UV Irradiation," *J. Phys. Chem. C* 116:3944-3950, American Chemical Society, United States (2012).

Ziegler, J., et al., "Silica-Coated InP/ZnS Nanocrystals as Converter Material in White LEDs," *Adv. Mater* 20:4068-4073, Wiley-VCH Verlag GmbH & Co., Germany (2008).

International Search Report and Written Opinion for International Application No. PCT/US2018/031940, European Patent Office, Netherlands, dated Aug. 30, 2018, 13 pages.

* cited by examiner

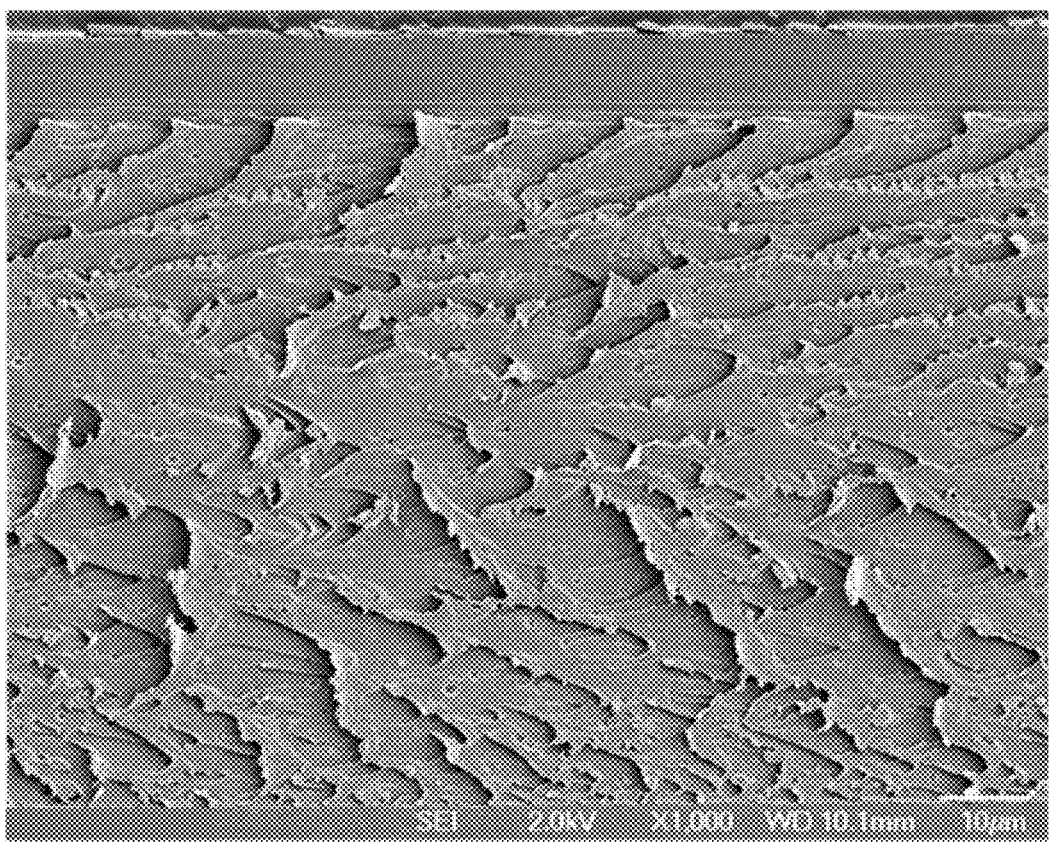

IN-SITU CROSS-LINKING OF EMULSIFIED QUANTUM DOT-CONTAINING DOMAINS WITHIN A CARRIER RESIN

BACKGROUND OF THE INVENTION

Field of the Invention

The present invention provides quantum dot compositions and methods of producing quantum dot compositions. The quantum dot compositions comprise a population of quantum dots, an aminosilicone polymer, an epoxy-functional silicone, and an organic resin. The present invention also provides quantum dot films comprising a quantum dot layer and methods of making quantum dot films.

Background of the Invention

A present method of preparing CdSe quantum dot films starts by dispersing quantum dots within an aminosilicone oligomer at a high optical density. This mixture, called a concentrate, is emulsified into a two-part epoxy amine resin. After emulsification, the mixture is processed into a film.

The present emulsification process results in a dispersed liquid phase separated within another liquid. As a liquid-in-liquid mixture without the presence of any stabilizing emulsifying agents, the dispersed droplets are not thermodynamically stable and are subject to coagulation into larger and larger primary particle sizes. Coagulation of the droplets results in a mixture that does not have a useful product shelf life. And, films cast using these mixtures containing coagulated droplets have poor optical and mechanical properties. Therefore, in order to process the materials into optical films, it is necessary for the mixture to be made shortly before the film is processed.

In order to prepare a product which can exist as a pre-mixture of the quantum dot concentrate in a curable resin, steps must be taken to stabilize the emulsified aminosilicone droplets and prevent them from being able to coagulate into larger and larger domains.

A need exists to prepare quantum dot compositions and/or resin mixes that have improved stability and result in improved optical properties when used to prepare a quantum dot film.

BRIEF SUMMARY OF THE INVENTION

The present invention provides a quantum dot composition, comprising:
(a) at least one population of quantum dots;
(b) at least one aminosilicone polymer;
(c) at least one epoxy-functional silicone; and
(d) at least one organic resin;
wherein the quantum dot composition comprises cross-linked domains of aminosilicone polymer and epoxy-functional silicone.

In some embodiments, the quantum dot composition comprises between one and five populations of quantum dots. In some embodiments, the quantum dot composition comprises two populations of quantum dots.

In some embodiments, the at least one population of quantum dots contains a core selected from the group consisting of InP, InZnP, InGaP, CdSe, CdS, CdSSe, CdZnSe, CdZnS, ZnSe, ZnSSe, InAs, InGaAs, and InAsP.

In some embodiments, the quantum dot composition comprises as a weight percentage between 0.0001% and 2% of the at least one population of quantum dots.

In some embodiments, the quantum dot composition comprises between one and five aminosilicone polymers. In some embodiments, the quantum dot composition comprises two aminosilicone polymers.

In some embodiments, the quantum dot composition comprises as a weight percentage between 0.01% and 50% of the at least one aminosilicone polymer.

In some embodiments, the quantum dot composition comprises between one and five epoxy-functional silicones. In some embodiments, the quantum dot composition comprises one epoxy-functional silicone.

In some embodiments, the at least one epoxy-functional silicone has the structure of formula IV:

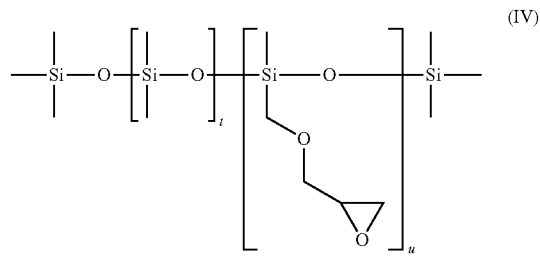

wherein t is an integer between 0 and 700 and u is an integer between 1 and 100.

In some embodiments, the quantum dot composition comprises as a weight percentage between 0.01% and 50% of the at least one epoxy-functional silicone.

In some embodiments, the quantum dot composition comprises between one and five organic resins. In some embodiments, the quantum dot composition comprises two organic resins.

In some embodiments, the at least one organic resin is a thermosetting resin or a UV curable resin.

In some embodiments, the at least one organic resin is a UV curable resin.

In some embodiments, the at least one organic resin is a mercapto-functional compound.

In some embodiments, the at least one organic resin is a isocyante, an epoxy, or an unsaturated compound.

In some embodiments, the quantum dot composition further comprises a thermal initiator or a photoiniator.

In some embodiments, the quantum dot composition comprises as a weight percentage between 50% and 99% of the at least one organic resin.

In some embodiments, the cross-linked domains of the quantum dot composition have an average size of between about 0.5 and about 10 microns.

In some embodiments, the quantum dot composition comprises 2 populations of quantum dots, 2 aminosilicone polymers, 1 epoxy-functional silicone, and 2 organic resins.

In some embodiments, a molded article is prepared comprising the quantum dot composition. In some embodiments, the molded article is a film, a substrate for a display, or a light emitting diode. In some embodiments, the molded article is a film.

The present invention provides a method of preparing a quantum dot composition, comprising:
(a) providing a composition comprising at least one population of quantum dots and at least one aminosilicone;
(b) admixing at least one epoxy-functional silicone with the composition of (a); and
(c) admixing at least one organic resin with the composition of (b).

In some embodiments, a composition comprising two populations of quantum dots is provided.

In some embodiments, a composition is provided wherein the at least one population of quantum dots contains a core selected from the group consisting of InP, InZnP, InGaP, CdSe, CdS, CdSSe, CdZnSe, CdZnS, ZnSe, ZnSSe, InAs, InGaAs, and InAsP.

In some embodiments, the quantum dot composition comprises as a weight percentage between 0.0001% and 2% of the at least one population of quantum dots.

In some embodiments, a composition comprising between one and five aminosilicone polymers is provided. In some embodiments, a composition comprising two aminosilicone polymers is provided.

In some embodiments, the quantum dot composition comprises as a weight percentage between 0.01% and 50% of the at least one aminosilicone polymer.

In some embodiments, between one and five epoxy-functional silicones are admixed.

In some embodiments, one epoxy-functional silicone is admixed.

In some embodiments, the at least one epoxy-functional silicone has the structure of formula IV:

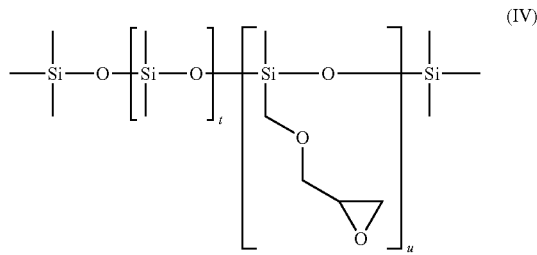

wherein t is an integer between 0 and 700 and u is an integer between 1 and 100.

In some embodiments, the quantum dot composition comprises as a weight percentage between 0.01% and 50% of the at least one epoxy-functional silicone.

In some embodiments, the composition of (a) is stored for between 1 minute and 3 years before the admixing in (b).

In some embodiments, the admixing in (b) is at an agitation rate between 100 rpm and 10,000 rpm.

In some embodiments, the admixing in (b) is for a time of between 10 minutes and 24 hours.

In some embodiments, two organic resins are admixed in (c).

In some embodiments, the at least one organic resin is a thermosetting resin or a UV curable resin. In some embodiments, the at least one organic resin is a UV curable resin.

In some embodiments, the at least one organic resin is a mercapto-functional compound.

In some embodiments, the at least one organic resin is a isocyante, an epoxy, or an unsaturated compound.

In some embodiments, the method further comprises admixing at least one thermal initiator or photoiniator with the composition of (c).

In some embodiments, the quantum dot composition comprises as a weight percentage between 50% and 99% of the at least one organic resin.

In some embodiments, the admixing in (c) is at an agitation rate between 100 rpm and 10,000 rpm.

In some embodiments, the admixing in (c) is for a time of between 10 minutes and 24 hours.

In some embodiments, the at least one aminosilicone polymer and the at least one epoxy-functional silicone form cross-linked domains.

In some embodiments, the method of preparing a quantum dot composition further comprises curing the composition of (c) using thermal curing or UV curing.

The present invention also provides a method of preparing a quantum dot composition, comprising:
  (a) providing a composition comprising at least one population of quantum dots, at least one aminosilicone, and at least at least one organic resin; and
  (b) admixing at least one epoxy-functional silicone with the composition of (a).

In some embodiments, the composition comprises two populations of quantum dots.

In some embodiments, the at least one population of quantum dots contains a core selected from the group consisting of InP, InZnP, InGaP, CdSe, CdS, CdSSe, CdZnSe, CdZnS, ZnSe, ZnSSe, InAs, InGaAs, and InAsP.

In some embodiments, the quantum dot composition comprises as a weight percentage between 0.0001% and 2% of the at least one population of quantum dots.

In some embodiments, the composition comprises between one and five aminosilicone polymers. In some embodiments, the composition comprises two aminosilicone polymers.

In some embodiments, the quantum dot composition comprises as a weight percentage between 0.01% and 50% of the at least one aminosilicone polymer.

In some embodiments, the composition in (a) comprises two organic resins.

In some embodiments, the at least one organic resin is a thermosetting resin or a UV curable resin. In some embodiments, the at least one organic resin is a UV curable resin.

In some embodiments, the at least one organic resin is a mercapto-functional compound.

In some embodiments, the at least one organic resin is a isocyante, an epoxy, or an unsaturated compound.

In some embodiments, the quantum dot composition comprises as a weight percentage between 50% and 99% of the at least one organic resin.

In some embodiments, the admixing in (b) is at an agitation rate between 100 rpm and 10,000 rpm.

In some embodiments, the admixing in (b) is for a time of between 10 minutes and 24 hours.

In some embodiments, the composition of (a) is stored for between 1 minute and 3 years before the admixing in (b).

In some embodiments, the composition comprises between one and five epoxy-functional silicones. In some embodiments, the composition comprises one epoxy-functional silicone.

In some embodiments, the at least one epoxy-functional silicone has the structure of formula IV:

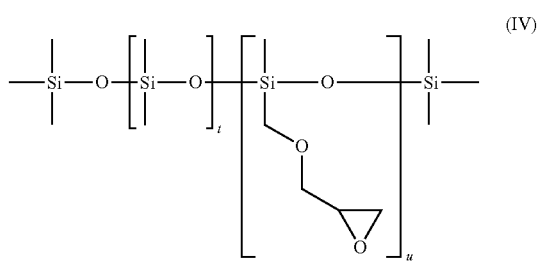

wherein t is an integer between 0 and 700 and u is an integer between 1 and 100.

In some embodiments, the quantum dot composition comprises as a weight percentage between 0.01% and 50% of the at least one epoxy-functional silicone.

In some embodiments, the method further comprises admixing at least one thermal initiator or photoiniator with the composition of (b).

In some embodiments, the at least one aminosilicone polymer and the at least one epoxy-functional silicone form cross-linked domains.

In some embodiments, the method further comprises curing the composition of (b) using thermal curing or UV curing.

The present invention also provides a quantum dot film kit comprising:
 (a) a first composition comprising at least one population of quantum dots and at least one aminosilicone polymer;
 (b) a second composition comprising at least one epoxy-functional silicone;
 (c) a third composition comprising at least one organic resin; and
 (d) instructions for preparing a quantum dot film.

The present invention also provides a quantum dot film kit comprising:
 (a) a first composition comprising at least one population of quantum dots, at least one aminosilicone polymer, and at least one organic resin;
 (b) a second composition comprising at least one epoxy-functional silicone; and
 (c) instructions for preparing a quantum dot film.

BRIEF DESCRIPTION OF THE DRAWINGS

FIG. 1 is a scanning electron microscopy (SEM) photograph of the cured quantum dot containing film prepared by Example 5. The SEM photograph shows small cross-linked domains of aminosilicone-based quantum dot concentrate within a resin.

DETAILED DESCRIPTION OF THE INVENTION

Unless defined otherwise, all technical and scientific terms used herein have the same meaning as commonly understood by one of ordinary skill in the art to which the invention pertains. The following definitions supplement those in the art and are directed to the current application and are not to be imputed to any related or unrelated case, e.g., to any commonly owned patent or application. Although any methods and materials similar or equivalent to those described herein can be used in the practice for testing of the present invention, the preferred materials and methods are described herein. Accordingly, the terminology used herein is for the purpose of describing particular embodiments only, and is not intended to be limiting.

As used in this specification and the appended claims, the singular forms "a," "an" and "the" include plural referents unless the context clearly dictates otherwise. Thus, for example, reference to "a nanostructure" includes a plurality of such nanostructures, and the like.

The term "about" as used herein indicates the value of a given quantity varies by ±10% of the value. For example, "about 100 nm" encompasses a range of sizes from 90 nm to 110 nm, inclusive.

A "nanostructure" is a structure having at least one region or characteristic dimension with a dimension of less than about 500 nm. In some embodiments, the nanostructure has a dimension of less than about 200 nm, less than about 100 nm, less than about 50 nm, less than about 20 nm, or less than about 10 nm. Typically, the region or characteristic dimension will be along the smallest axis of the structure. Examples of such structures include nanowires, nanorods, nanotubes, branched nanostructures, nanotetrapods, tripods, bipods, nanocrystals, nanodots, quantum dots, nanoparticles, and the like. Nanostructures can be, e.g., substantially crystalline, substantially monocrystalline, polycrystalline, amorphous, or a combination thereof. In some embodiments, each of the three dimensions of the nanostructure has a dimension of less than about 500 nm, less than about 200 nm, less than about 100 nm, less than about 50 nm, less than about 20 nm, or less than about 10 nm.

The term "heterostructure" when used with reference to nanostructures refers to nanostructures characterized by at least two different and/or distinguishable material types. Typically, one region of the nanostructure comprises a first material type, while a second region of the nanostructure comprises a second material type. In certain embodiments, the nanostructure comprises a core of a first material and at least one shell of a second (or third etc.) material, where the different material types are distributed radially about the long axis of a nanowire, a long axis of an arm of a branched nanowire, or the center of a nanocrystal, for example. A shell can but need not completely cover the adjacent materials to be considered a shell or for the nanostructure to be considered a heterostructure; for example, a nanocrystal characterized by a core of one material covered with small islands of a second material is a heterostructure. In other embodiments, the different material types are distributed at different locations within the nanostructure; e.g., along the major (long) axis of a nanowire or along a long axis of arm of a branched nanowire. Different regions within a heterostructure can comprise entirely different materials, or the different regions can comprise a base material (e.g., silicon) having different dopants or different concentrations of the same dopant.

As used herein, the "diameter" of a nanostructure refers to the diameter of a cross-section normal to a first axis of the nanostructure, where the first axis has the greatest difference in length with respect to the second and third axes (the second and third axes are the two axes whose lengths most nearly equal each other). The first axis is not necessarily the longest axis of the nanostructure; e.g., for a disk-shaped nanostructure, the cross-section would be a substantially circular cross-section normal to the short longitudinal axis of the disk. Where the cross-section is not circular, the diameter is the average of the major and minor axes of that cross-section. For an elongated or high aspect ratio nanostructure, such as a nanowire, the diameter is measured across a cross-section perpendicular to the longest axis of the nanowire. For a spherical nanostructure, the diameter is measured from one side to the other through the center of the sphere.

The terms "crystalline" or "substantially crystalline," when used with respect to nanostructures, refer to the fact that the nanostructures typically exhibit long-range ordering across one or more dimensions of the structure. It will be understood by one of skill in the art that the term "long range ordering" will depend on the absolute size of the specific nanostructures, as ordering for a single crystal cannot extend beyond the boundaries of the crystal. In this case, "long-range ordering" will mean substantial order across at least the majority of the dimension of the nanostructure. In some instances, a nanostructure can bear an oxide or other coating, or can be comprised of a core and at least one shell. In such instances it will be appreciated that the oxide, shell(s), or other coating can but need not exhibit such ordering (e.g. it can be amorphous, polycrystalline, or otherwise). In such instances, the phrase "crystalline," "substantially crystalline," "substantially monocrystalline," or "monocrystalline" refers to the central core of the nanostructure (excluding the coating layers or shells). The terms "crystalline" or "substantially crystalline" as used herein are intended to also encompass structures comprising various defects, stacking faults, atomic substitutions, and the like, as long as the structure exhibits substantial long range ordering (e.g., order over at least about 80% of the length of at least one axis of the nanostructure or its core). In addition, it will be appreciated that the interface between a core and the outside of a nanostructure or between a core and an adjacent shell or between a shell and a second adjacent shell may contain non-crystalline regions and may even be amorphous. This does not prevent the nanostructure from being crystalline or substantially crystalline as defined herein.

The term "monocrystalline" when used with respect to a nanostructure indicates that the nanostructure is substantially crystalline and comprises substantially a single crystal. When used with respect to a nanostructure heterostructure comprising a core and one or more shells, "monocrystalline" indicates that the core is substantially crystalline and comprises substantially a single crystal.

A "nanocrystal" is a nanostructure that is substantially monocrystalline. A nanocrystal thus has at least one region or characteristic dimension with a dimension of less than about 500 nm. In some embodiments, the nanocrystal has a dimension of less than about 200 nm, less than about 100 nm, less than about 50 nm, less than about 20 nm, or less than about 10 nm. The term "nanocrystal" is intended to encompass substantially monocrystalline nanostructures comprising various defects, stacking faults, atomic substitutions, and the like, as well as substantially monocrystalline nanostructures without such defects, faults, or substitutions. In the case of nanocrystal heterostructures comprising a core and one or more shells, the core of the nanocrystal is typically substantially monocrystalline, but the shell(s) need not be. In some embodiments, each of the three dimensions of the nanocrystal has a dimension of less than about 500 nm, less than about 200 nm, less than about 100 nm, less than about 50 nm, less than about 20 nm, or less than about 10 nm.

The term "quantum dot" (or "dot") refers to a nanocrystal that exhibits quantum confinement or exciton confinement. Quantum dots can be substantially homogenous in material properties, or in certain embodiments, can be heterogeneous, e.g., including a core and at least one shell. The optical properties of quantum dots can be influenced by their particle size, chemical composition, and/or surface composition, and can be determined by suitable optical testing available in the art. The ability to tailor the nanocrystal size, e.g., in the range between about 1 nm and about 15 nm, enables photoemission coverage in the entire optical spectrum to offer great versatility in color rendering.

A "ligand" is a molecule capable of interacting (whether weakly or strongly) with one or more faces of a nanostructure, e.g., through covalent, ionic, van der Waals, or other molecular interactions with the surface of the nanostructure.

"Photoluminescence quantum yield" is the ratio of photons emitted to photons absorbed, e.g., by a nanostructure or population of nanostructures. As known in the art, quantum yield is typically determined by a comparative method using well-characterized standard samples with known quantum yield values.

As used herein, the term "shell" refers to material deposited onto the core or onto previously deposited shells of the same or different composition and that result from a single act of deposition of the shell material. The exact shell thickness depends on the material as well as the precursor input and conversion and can be reported in nanometers or monolayers. As used herein, "target shell thickness" refers to the intended shell thickness used for calculation of the required precursor amount. As used herein, "actual shell thickness" refers to the actually deposited amount of shell material after the synthesis and can be measured by methods known in the art. By way of example, actual shell thickness can be measured by comparing particle diameters determined from transmission electron microscopy (TEM) images of nanocrystals before and after a shell synthesis.

As used herein, the term "full width at half-maximum" (FWHM) is a measure of the size distribution of quantum dots. The emission spectra of quantum dots generally have the shape of a Gaussian curve. The width of the Gaussian curve is defined as the FWHM and gives an idea of the size distribution of the particles. A smaller FWHM corresponds to a narrower quantum dot nanocrystal size distribution. FWHM is also dependent upon the emission wavelength maximum.

As used herein, the term "functional group equivalent weight" (FGEW) is used to determine the ratio of the reactive functional groups in a polymer. The FGEW of a polymer is defined as the ratio of the number average molecular weight (NAMW) to the number of functional groups in the polymer (n). It is the weight of a polymer that contains one formula weight of the functional group. The FGEW can be calculated using end-group analysis by counting the number of reactive functional groups and dividing into the number average molecular weight:

$$FGEW=NAMW/n$$

where n=the number of reactive functional groups in the monomer.

"Alkyl" as used herein refers to a straight or branched, saturated, aliphatic radical having the number of carbon atoms indicated. In some embodiments, the alkyl is $C_{1-2}$ alkyl, $C_{1-3}$ alkyl, $C_{1-4}$ alkyl, $C_{1-5}$ alkyl, $C_{1-6}$ alkyl, $C_{1-7}$ alkyl, $C_{1-8}$ alkyl, $C_{1-9}$ alkyl, $C_{1-10}$ alkyl, $C_{1-12}$ alkyl, $C_{1-14}$ alkyl, $C_{1-16}$ alkyl, $C_{1-18}$ alkyl, $C_{1-20}$ alkyl, $C_{8-20}$ alkyl, $C_{12-20}$ alkyl, $C_{14-20}$ alkyl, $C_{16-20}$ alkyl, or $C_{18-20}$ alkyl. For example, $C_{1-6}$ alkyl includes, but is not limited to, methyl, ethyl, propyl, isopropyl, butyl, isobutyl, sec-butyl, tert-butyl, pentyl, isopentyl, and hexyl. In some embodiments, the alkyl is octyl, nonyl, decyl, undecyl, dodecyl, tridecyl, tetradecyl, pentadecyl, hexadecyl, heptadecyl, octadecyl, nonadecyl, or icosanyl.

"Alkenyl" as used herein refers to a monovalent group derived from a straight- or branched-chain hydrocarbon moiety having at least one carbon-carbon double bond by the removal of a single hydrogen atom. In some embodiments, the alkenyl group contains 2-20 carbon atoms and is a $C_{2-20}$ alkenyl. In some embodiments, the alkenyl group contains 2-15 carbon atoms and is a $C_{2-15}$ alkenyl. In some embodiments, the alkenyl group contains 2-10 carbon atoms and is a $C_{2-10}$ alkenyl. In some embodiments, the alkenyl group contains 2-8 carbon atoms and is a $C_{2-8}$ alkenyl. In some embodiments, the alkenyl group contains 2-5 carbons and is a $C_{2-5}$ alkenyl. Alkenyl groups include, for example, ethenyl, propenyl, butenyl, and 1-methyl-2-buten-1-yl.

"Alkynyl" as used herein refers to a monovalent group derived from a straight- or branched-chain hydrocarbon having at least one carbon-carbon triple bond by the removal of a single hydrogen atom. In some embodiments, the alkynyl group contains 2-20 carbon atoms and is a $C_{2-20}$ alkynyl. In some embodiments, the alkynyl group contains 2-15 carbon atoms and is a $C_{2-15}$ alkynyl. In some embodiments, the alkynyl group contains 2-10 carbon atoms and is a $C_{2-10}$ alkynyl. In some embodiments, the alkynyl group contains 2-8 carbon atoms and is a $C_{2-8}$ alkynyl. In some embodiments, the alkynyl group contains 2-5 carbons and is a $C_{2-5}$ alkynyl. Representative alkynyl groups include, but are not limited to, ethynyl, 2-propynyl (propargyl), and 1-propynyl.

"Alkylamino" as used herein, refers to a "substituted amino" of the formula ($-NR^K_2$), wherein $R^K$ is, independently, a hydrogen or an optionally substituted alkyl group, as defined herein, and the nitrogen moiety is directly attached to the parent molecule.

"Heteroalkyl" as used herein, refers to an alkyl moiety which is optionally substituted with one or more functional groups, and that contain one or more oxygen, sulfur, nitrogen, phosphorus, or silicon atoms, e.g., in place of carbon atoms.

"Cycloalkyl" as used herein, refers to a monovalent or divalent group of 3 to 8 carbon atoms, preferably 3 to 5 carbon atoms derived from a saturated cyclic hydrocarbon. Cycloalkyl groups can be monocyclic or polycyclic. Cycloalkyl can be substituted by $C_{1-3}$ alkyl groups or halogens.

"Carboxyalkyl" as used herein, refers to a carboxylic acid group (—COOH) appended to a lower alkyl radical.

"Heterocycloalkyl" as used herein, refers to cycloalkyl substituents that have from 1 to 5, and more typically from 1 to 4 heteroatoms in the ring structure. Suitable heteroatoms employed in compounds of the present invention are nitrogen, oxygen, and sulfur. Representative heterocycloalkyl moieties include, for example, morpholino, piperazinyl, piperidinyl, and the like.

The term "alkylene," as used herein, alone or in combination, refers to a saturated aliphatic group derived from a straight or branched chain saturated hydrocarbon attached at two or more positions, such as methylene (—$CH_2$—). Unless otherwise specified, the term "alkyl" may include "alkylene" groups.

"Aryl" as used herein refers to unsubstituted monocyclic or bicyclic aromatic ring systems having from six to fourteen carbon atoms, i.e., a $C_{6-14}$ aryl. Non-limiting exemplary aryl groups include phenyl, naphthyl, phenanthryl, anthracyl, indenyl, azulenyl, biphenyl, biphenylenyl, and fluorenyl groups. In one embodiment, the aryl group is a phenyl or naphthyl.

"Heteroaryl" or "heteroaromatic" as used herein refers to unsubstituted monocyclic and bicyclic aromatic ring systems having 5 to 14 ring atoms, i.e., a 5- to 14-membered heteroaryl, wherein at least one carbon atom of one of the rings is replaced with a heteroatom independently selected from the group consisting of oxygen, nitrogen, and sulfur. In one embodiment, the heteroaryl contains 1, 2, 3, or 4 heteroatoms independently selected from the group consisting of oxygen, nitrogen, and sulfur. In one embodiment, the heteroaryl has three heteroatoms. In another embodiment, the heteroaryl has two heteroatoms. In another embodiment, the heteroaryl has one heteroatom. In another embodiment, the heteroaryl is a 5- to 10-membered heteroaryl. In another embodiment, the heteroaryl is a 5- or 6-membered heteroaryl. In another embodiment, the heteroaryl has 5 ring atoms, e.g., thienyl, a 5-membered heteroaryl having four carbon atoms and one sulfur atom. In another embodiment, the heteroaryl has 6 ring atoms, e.g., pyridyl, a 6-membered heteroaryl having five carbon atoms and one nitrogen atom. Non-limiting exemplary heteroaryl groups include thienyl, benzo[b]thienyl, naphtho[2,3-b]thienyl, thianthrenyl, furyl, benzofuryl, pyranyl, isobenzofuranyl, benzooxazonyl, chromenyl, xanthenyl, 2H-pyrrolyl, pyrrolyl, imidazolyl, pyrazolyl, pyridyl, pyrazinyl, pyrimidinyl, pyridazinyl, isoindolyl, 3H-indolyl, indolyl, indazolyl, purinyl, isoquinolyl, quinolyl, phthalazinyl, naphthyridinyl, cinnolinyl, quinazolinyl, pteridinyl, 4aH-carbazolyl, carbazolyl, β-carbolinyl, phenanthridinyl, acridinyl, pyrimidinyl, phenanthrolinyl, phenazinyl, thiazolyl, isothiazolyl, phenothiazolyl, isoxazolyl, furazanyl, and phenoxazinyl. In one embodiment, the heteroaryl is thienyl (e.g., thien-2-yl and thien-3-yl), furyl (e.g., 2-furyl and 3-furyl), pyrrolyl (e.g., 1H-pyrrol-2-yl and 1H-pyrrol-3-yl), imidazolyl (e.g., 2H-imidazol-2-yl and 2H-imidazol-4-yl), pyrazolyl (e.g., 1H-pyrazol-3-yl, 1H-pyrazol-4-yl, and 1H-pyrazol-5-yl), pyridyl (e.g., pyridin-2-yl, pyridin-3-yl, and pyridin-4-yl), pyrimidinyl (e.g., pyrimidin-2-yl, pyrimidin-4-yl, and pyrimidin-5-yl), thiazolyl (e.g., thiazol-2-yl, thiazol-4-yl, and thiazol-5-yl), isothiazolyl (e.g., isothiazol-3-yl, isothiazol-4-yl, and isothiazol-5-yl), oxazolyl (e.g., oxazol-2-yl, oxazol-4-yl, and oxazol-5-yl), isoxazolyl (e.g., isoxazol-3-yl, isoxazol-4-yl, and isoxazol-5-yl), or indazolyl (e.g., 1H-indazol-3-yl). The term "heteroaryl" also includes possible N-oxides. A non-limiting exemplary N-oxide is pyridyl N-oxide.

Unless clearly indicated otherwise, ranges listed herein are inclusive.

A variety of additional terms are defined or otherwise characterized herein.

Quantum Dot Composition

In some embodiments, the present invention provides a quantum dot composition comprising:
  (a) at least one population of quantum dots;
  (b) at least one aminosilicone polymer;
  (c) at least one epoxy-functional silicone; and
  (d) at least one organic resin;
wherein the quantum dot composition comprises cross-linked domains of aminosilicone polymer and epoxy-functional silicone.

In some embodiments, the quantum dot composition further comprises a solvent.

In some embodiments, the present invention provides a quantum dot film kit comprising:
  (a) a first composition comprising at least one population of quantum dots and at least one aminosilicone polymer;
  (b) a second composition comprising at least one epoxy-functional silicone;
  (c) a third composition comprising at least one organic resin; and
  (d) instructions for preparing a quantum dot film.

In some embodiments, the present invention provides a quantum dot film kit comprising:
  (a) a first composition comprising at least one population of quantum dots, at least one aminosilicone polymer, and at least one organic resin;
  (b) a second composition comprising at least one epoxy-functional silicone; and
  (c) instructions for preparing a quantum dot film.

In some embodiments, the quantum dot film kit further comprises a solvent.

Quantum Dot Film Layer

In some embodiments, the present invention provides a quantum dot film layer comprising:
(a) at least one population of quantum dots;
(b) at least one aminosilicone polymer;
(b) at least one epoxy-functional silicone; and
(c) at least one organic resin;
wherein the quantum dot film layer comprises cross-linked domains of aminosilicone polymer and epoxy-functional silicone.

Quantum Dot Molded Article

In some embodiments, the present invention provides a quantum dot molded article comprising:
(a) at least one population of quantum dots;
(b) at least one aminosilicone polymer;
(c) at least one epoxy-functional silicone; and
(d) at least one organic resin;
wherein the molded article contains cross-linked domains of the at least one aminosilicone polymer and the at least one epoxy-functional silicone.

In some embodiments, the molded article is a film, a substrate for a display, or a light emitting diode.

In some embodiments, the present invention provides a quantum dot film comprising:
(a) a first barrier layer;
(b) a second barrier layer; and
(c) a quantum dot layer between the first barrier layer and the second barrier layer, wherein the quantum dot layer comprises at least one population of quantum dots; at least one aminosilicone polymer; at least one epoxy-functional silicone; and at least one organic resin.

Quantum Dots

The quantum dots (or other nanostructures) for use in the present invention can be produced from any suitable material, suitably an inorganic material, and more suitably an inorganic conductive or semiconductive material. Suitable semiconductor materials include any type of semiconductor, including Group II-VI, Group III-V, Group IV-VI, and Group IV semiconductors. Suitable semiconductor materials include, but are not limited to, Si, Ge, Sn, Se, Te, B, C (including diamond), P, BN, BP, BAs, AlN, AlP, AlAs, AlSb, GaN, GaP, GaAs, GaSb, InN, InP, InAs, InSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $Al_2CO$, and combinations thereof.

The synthesis of Group II-VI nanostructures has been described in U.S. Pat. Nos. 6,225,198, 6,322,901, 6,207,229, 6,607,829, 6,861,155, 7,060,243, 7,125,605, 7,374,824, 7,566,476, 8,101,234, and 8,158,193 and in U.S. Patent Appl. Publication Nos. 2011/0262752 and 2011/0263062. In some embodiments, the core is a Group II-VI nanocrystal selected from the group consisting of ZnO, ZnSe, ZnS, ZnTe, CdO, CdSe, CdS, CdTe, HgO, HgSe, HgS, and HgTe. In some embodiments, the core is a nanocrystal selected from the group consisting of ZnSe, ZnS, CdSe, and CdS.

Although Group II-VI nanostructures such as CdSe and CdS quantum dots can exhibit desirable luminescence behavior, issues such as the toxicity of cadmium limit the applications for which such nanostructures can be used. Less toxic alternatives with favorable luminescence properties are thus highly desirable. Group III-V nanostructures in general and InP-based nanostructures in particular, offer the best known substitute for cadmium-based materials due to their compatible emission range.

In some embodiments, the nanostructures are free from cadmium. As used herein, the term "free of cadmium" is intended that the nanostructures contain less than 100 ppm by weight of cadmium. The Restriction of Hazardous Substances (RoHS) compliance definition requires that there must be no more than 0.01% (100 ppm) by weight of cadmium in the raw homogeneous precursor materials. The cadmium level in the Cd-free nanostructures of the present invention is limited by the trace metal concentration in the precursor materials. The trace metal (including cadmium) concentration in the precursor materials for the Cd-free nanostructures, can be measured by inductively coupled plasma mass spectroscopy (ICP-MS) analysis, and are on the parts per billion (ppb) level. In some embodiments, nanostructures that are "free of cadmium" contain less than about 50 ppm, less than about 20 ppm, less than about 10 ppm, or less than about 1 ppm of cadmium.

In some embodiments, the core is a Group III-V nanostructure. In some embodiments, the core is a Group III-V nanocrystal selected from the group consisting of BN, BP, BAs, BSb, AlN, AlP, AlAs, AlSb, GaN, GaP, GaAs, GaSb, InN, InP, InAs, and InSb. In some embodiments, the core is a InP nanocrystal.

The synthesis of Group III-V nanostructures has been described in U.S. Pat. Nos. 5,505,928, 6,306,736, 6,576,291, 6,788,453, 6,821,337, 7,138,098, 7,557,028, 7,645,397, 8,062,967, and 8,282,412 and in U.S. Patent Appl. Publication No. 2015/236195. Synthesis of Group III-V nanostructures has also been described in Wells, R. L., et al., "The use of tris(trimethylsilyl)arsine to prepare gallium arsenide and indium arsenide," *Chem. Mater.* 1:4-6 (1989) and in Guzelian, A. A., et al., "Colloidal chemical synthesis and characterization of InAs nanocrystal quantum dots," *Appl. Phys. Lett.* 69: 1432-1434 (1996).

Synthesis of InP-based nanostructures has been described, e.g., in Xie, R., et al., "Colloidal InP nanocrystals as efficient emitters covering blue to near-infrared," *J. Am. Chem. Soc.* 129:15432-15433 (2007); Micic, O. I., et al., "Core-shell quantum dots of lattice-matched $ZnCdSe_2$ shells on InP cores: Experiment and theory," *J. Phys. Chem. B* 104:12149-12156 (2000); Liu, Z., et al., "Coreduction colloidal synthesis of III-V nanocrystals: The case of InP," *Angew. Chem. Int. Ed. Engl.* 47:3540-3542 (2008); Li, L. et al., "Economic synthesis of high quality InP nanocrystals using calcium phosphide as the phosphorus precursor," *Chem. Mater.* 20:2621-2623 (2008); D. Battaglia and X. Peng, "Formation of high quality InP and InAs nanocrystals in a noncoordinating solvent," *Nano Letters* 2:1027-1030 (2002); Kim, S., et al., "Highly luminescent InP/GaP/ZnS nanocrystals and their application to white light-emitting diodes," *J. Am. Chem. Soc.* 134:3804-3809 (2012); Nann, T., et al., "Water splitting by visible light: A nanophotocathode for hydrogen production," *Angew. Chem. Int. Ed.* 49:1574-1577 (2010); Borchert, H., et al., "Investigation of ZnS passivated InP nanocrystals by XPS," *Nano Letters* 2:151-154 (2002); L. Li and P. Reiss, "One-pot synthesis of highly luminescent InP/ZnS nanocrystals without precursor injection," *J. Am. Chem. Soc.* 130:11588-11589 (2008); Hussain, S., et al. "One-pot fabrication of high-quality InP/ZnS (core/shell) quantum dots and their application to cellular imaging," *Chemphyschem.* 10:1466-1470 (2009); Xu, S., et al., "Rapid synthesis of high-quality InP nanocrystals," *J. Am. Chem. Soc.* 128:1054-1055 (2006); Micic, O. I., et al., "Size-dependent spectroscopy of InP quantum dots," *J. Phys. Chem. B* 101:4904-4912 (1997); Haubold, S., et al., "Strongly luminescent InP/ZnS core-shell nanoparticles," *Chemphyschem.* 5:331-334 (2001); CrosGagneux, A., et al., "Surface chemistry of InP quantum dots: A comprehensive study," *J. Am. Chem. Soc.* 132:18147-18157 (2010); Micic, O. I., et al., "Synthesis and characterization of InP, GaP, and GaInP$_2$ quantum dots," *J. Phys. Chem.* 99:7754-7759 (1995); Guzelian, A. A., et al., "Synthesis of size-selected, surface-passivated InP nanocrystals," *J. Phys. Chem.* 100: 7212-7219 (1996); Lucey, D. W., et al., "Monodispersed InP quantum dots prepared by colloidal chemistry in a non-coordinating solvent," *Chem. Mater.* 17:3754-3762 (2005); Lim, J., et al., "InP@ZnSeS, core@composition gradient shell quantum dots with enhanced stability," *Chem. Mater.* 23:4459-4463 (2011); and Zan, F., et al., "Experimental studies on blinking behavior of single InP/ZnS quantum dots: Effects of synthetic conditions and UV irradiation," *J. Phys. Chem. C* 116:394-3950 (2012).

In some embodiments, the core is doped. In some embodiments, the dopant of the nanocrystal core comprises a metal, including one or more transition metals. In some embodiments, the dopant is a transition metal selected from the group consisting of Ti, Zr, Hf, V, Nb, Ta, Cr, Mo, W, Mn, Tc, Re, Fe, Ru, Os, Co, Rh, Ir, Ni, Pd, Pt, Cu, Ag, Au, and combinations thereof. In some embodiments, the dopant comprises a non-metal. In some embodiments, the dopant is ZnS, ZnSe, ZnTe, CdSe, CdS, CdTe, HgS, HgSe, HgTe, CuInS$_2$, CuInSe$_2$, AlN, AlP, AlAs, GaN, GaP, or GaAs.

Inorganic shell coatings on quantum dots are a universal approach to tailoring their electronic structure. Additionally, deposition of an inorganic shell can produce more robust particles by passivation of surface defects. Ziegler, J., et al., *Adv. Mater.* 20:4068-4073 (2008). For example, shells of wider band gap semiconductor materials such as ZnS can be deposited on a core with a narrower band gap—such as CdSe or InP—to afford structures in which excitons are confined within the core. This approach increases the probability of radiative recombination and makes it possible to synthesize very efficient quantum dots with quantum yields close to unity and thin shell coatings.

In certain embodiments, the nanostructure comprises a core of a first material and at least one shell of a second (or third etc.) material, where the different material types are distributed radially about the long axis of a nanowire, a long axis of an arm of a branched nanowire, or the center of a nanocrystal, for example. A shell can but need not completely cover the adjacent materials to be considered a shell or for the nanostructure to be considered a heterostructure; for example, a nanocrystal characterized by a core of one material covered with small islands of a second material is a heterostructure. In other embodiments, the different material types are distributed at different locations within the nanostructure; e.g., along the major (long) axis of a nanowire or along a long axis of arm of a branched nanowire. Different regions within a heterostructure can comprise entirely different materials, or the different regions can comprise a base material (e.g., silicon) having different dopants or different concentrations of the same dopant.

In some embodiments, the nanostructures of the present invention include a core and at least one shell. In some embodiments, the nanostructures of the present invention include a core and at least two shells. The shell can, e.g., increase the quantum yield and/or stability of the nanostructures. In some embodiments, the core and the shell comprise different materials. In some embodiments, the nanostructure comprises shells of different shell material.

Exemplary materials for preparing shells include, but are not limited to, Si, Ge, Sn, Se, Te, B, C (including diamond), P, Co, Au, BN, BP, BAs, AlN, AlP, AlAs, AlSb, GaN, GaP, GaAs, GaSb, InN, InP, InAs, InSb, GaSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, Si$_3$N$_4$, Ge$_3$N$_4$, Al$_2$O$_3$, Al$_2$CO$_3$ and combinations thereof.

In some embodiments, the shell is a mixture of at least two of a zinc source, a selenium source, a sulfur source, a tellurium source, and a cadmium source. In some embodiments, the shell is a mixture of two of a zinc source, a selenium source, a sulfur source, a tellurium source, and a cadmium source. In some embodiments, the shell is a mixture of three of a zinc source, a selenium source, a sulfur source, a tellurium source, and a cadmium source. In some embodiments, the shell is a mixture of: zinc and sulfur; zinc and selenium; zinc, sulfur, and selenium; zinc and tellurium; zinc, tellurium, and sulfur; zinc, tellurium, and selenium; zinc, cadmium, and sulfur; zinc, cadmium, and selenium; cadmium and sulfur; cadmium and selenium; cadmium, selenium, and sulfur; cadmium and zinc; cadmium, zinc, and sulfur; cadmium, zinc, and selenium; or cadmium, zinc, sulfur, and selenium.

Exemplary core/shell luminescent nanocrystals for use in the practice of the present invention include, but are not limited to (represented as core/shell) CdSe/ZnS, InP/ZnS, PbSe/PbS, CdSe/CdS, CdTe/CdS, and CdTe/ZnS. The synthesis of core/shell nanostructures is disclosed in U.S. Pat. No. 9,169,435.

The luminescent nanocrystals can be made from a material impervious to oxygen, thereby simplifying oxygen barrier requirements and photostabilization of the quantum dots in the quantum dot film layer. In exemplary embodiments, the luminescent nanocrystals are coated with one or more organic polymeric ligand material and dispersed in an organic polymeric matrix comprising one or more matrix materials, as discussed in more detail below. The luminescent nanocrystals can be further coated with one or more inorganic layers comprising one or more material such as a silicon oxide, an aluminum oxide, or a titanium oxide (e.g., SiO$_2$, Si$_2$O$_3$, TiO$_2$, or Al$_2$O$_3$), to hermetically seal the quantum dots.

In some embodiments, the quantum dots comprise ligands conjugated to, cooperated with, associated with, or attached to their surface. In some embodiments, the quantum dots include a coating layer comprising ligands to protect the quantum dots from external moisture and oxidation, to control aggregation, and to allow for dispersion of the quantum dots in the matrix material. Suitable ligands include those disclosed in U.S. Pat. Nos. 6,949,206; 7,267, 875; 7,374,807; 7,572,393; 7,645,397; and 8,563,133 and in U.S. Patent Appl. Publication Nos. 2008/237540; 2008/ 281010; and 2010/110728.

In some embodiments, the quantum dot comprises a multi-part ligand structure, such as the three-part ligand structure disclosed in U.S. Patent Appl. Publication No. 2008/237540, in which the head-group, tail-group, and middle/body group are independently fabricated and optimized for their particular function, and then combined into an ideally functioning complete surface ligand.

In some embodiments, the ligands comprise one or more organic polymeric ligands. Suitable ligands provide: efficient and strong bonding quantum dot encapsulation with low oxygen permeability; precipitate or segregate into domain in the matrix material to form a discontinuous dual-phase or multi-phase matrix; disperse favorably throughout the matrix material; and are commercially available materials or can be easily formulated from commercially available materials.

In some embodiments, the ligand is a polymer, a glassy polymer, a silicone, a carboxylic acid, a dicarboxylic acid, a polycarboxylic acid, an acrylic acid, a phosphonic acid, a phosphonate, a phosphine, a phosphine oxide, a sulfur, or an amine.

In some embodiments, the population of quantum dots emits red, green, or blue light. In some embodiments, the respective portions of red, green, and blue light can be controlled to achieve a desired white point for the white light emitted by a display device incorporating a quantum dot film.

In some embodiments, the quantum dot composition comprises at least one population of quantum dot material. In some embodiments, the quantum dot composition comprises a population of between 1 and 5, between 1 and 4, between 1 and 3, between 1 and 2, between 2 and 5, between 2 and 4, between 2 and 3, between 3 and 5, between 3 and 4, or between 4 and 5 quantum dot materials. Any suitable ratio of the populations of quantum dots can be combined to create the desired quantum dot composition characteristics.

In some embodiments, the quantum dot composition comprises, as a weight percentage of the quantum dot composition, between 0.001% and 2%, between 0.001% and 1%, between 0.001% and 0.5%, between 0.001% and 0.1%, between 0.001% and 0.01%, between 0.01% and 2%, between 0.01% and 1%, between 0.01% and 0.5%, between 0.01% and 0.1%, between 0.1% and 2%, between 0.1% and 1%, between 0.1% and 0.5%, between 0.5% and 2%, between 0.5% and 1%, or between 1% and 2% of quantum dots.

In some embodiments, the quantum dot molded article comprises, as a weight percentage of the quantum dot molded article, between 0.001% and 2%, between 0.001% and 1%, between 0.001% and 0.5%, between 0.001% and 0.1%, between 0.001% and 0.01%, between 0.01% and 2%, between 0.01% and 1%, between 0.01% and 0.5%, between 0.01% and 0.1%, between 0.1% and 2%, between 0.1% and 1%, between 0.1% and 0.5%, between 0.5% and 2%, between 0.5% and 1%, or between 1% and 2% of quantum dots.

Aminosilicone Polymer

In some embodiments, the quantum dots are dispersed in an aminosilicone polymer.

In some embodiments, the aminosilicone polymer has at least one diamino functional group (e.g., an aminoethylaminopropyl group). In some embodiments, an aminosilicone polymer will have a siloxane backbone. A siloxane backbone is characterized by —Si—O—Si— and is represented by the general formula —Si($R^A_2$)O—, where the $R^A$ groups can be the same or different, and can be any suitable group, including, but not limited to, hydrogen, alkyl, heteroalkyl, alkylamine, carboxyalkyl, alkenyl, alkynyl, cycloalkyl, heterocycloalkyl, aryl, and heteroaryl. The siloxane backbone can be linear, branched, or cyclic. The siloxane backbone can include a single type of monomer repeat unit, forming a homopolymer. Alternatively, the siloxane backbone can include two or more types of monomer repeat units to form a copolymer that can be a random copolymer or a block copolymer.

In some embodiments, the aminosilicone polymer is formed from the polymerization of (i) monomers of the form —O—Si—($R^B$)$_2$—O—, where $R^B$ is independently selected at each occurrence from lower alkyl groups, such as a methyl group at each occurrence, and (ii) monomers of the form OSi($R^C$)($R^D$)O, where $R^C$ is a lower alkyl group, such as a methyl, ethyl, or propyl, and $R^D$ is a diamine-substituted alkyl group of the form —(CH$_2$)$_{1-6}$—NR$^N$(CH$_2$)$_{1-6}$—NR$^N_2$, —(CH$_2$)$_{24}$—NR$^N$—(CH$_2$)$_{2-4}$—NR$^N_2$, or —(CH$_2$)$_3$—NR$^N$—(CH$_2$)$_2$—NR$^N_2$, where $R^N$ is independently selected at each occurrence from hydrogen or lower alkyl, such as a methyl, ethyl, or propyl. In some embodiments, the $R^D$ is a group —(CH$_2$)$_{1-6}$—NH—(CH$_2$)$_{1-6}$NH$_2$, —(CH$_2$)$_{2-4}$—NH—(CH$_2$)$_{1-3}$—NH$_2$, or —(CH$_2$)$_3$—NH—(CH$_2$)$_2$—NH$_2$. The aminosilicone may have a linear or branched chemical structure.

In some embodiments, the aminosilicone polymer contains ligands suitable for binding to quantum dots. Suitable ligands include, but are not limited to, amine, carboxy, and thiol groups, capable of binding to the quantum dot via hydrogen-bonding, hydrophobic interactions, or van der Waal's forces. In some embodiments, the aminosilicone polymer includes amine binding groups as the ligands. In some embodiments, the aminosilicone polymer includes amine and carboxy binding groups as the ligands.

In some embodiments, when the quantum dots are dispersed in the aminosilicone polymer, ligands on the aminosilicone polymer bind to the quantum dots.

In some embodiments, the FGEW of the aminosilicone is from about 1,000 g/mol to about 2,000 g/mol, from about 1,000 g/mol to 1,600 g/mol, from about 1,000 g/mol to about 1,400 g/mol, from about 1,400 g/mol to about 2,000 g/mol, from about 1,400 g/mol to about 1,600 g/mol, or from about 1,600 g/mol to about 2,000 g/mol. In some embodiments, the FGEW of the aminosilicone polymer has an FGEW of 1,200, 1,250, 1,300, 1,400, 1,500, 1,600, 1,700, or 1,800 g/mol. In some embodiments, the FGEW of the aminosilicone polymer is from about 1,250 to about 1,800 g/mol.

In some embodiments, the aminosilicone polymer is a commercially available aminosilicone polymer.

In some embodiments, the aminosilicone polymer is SF1708 (Momentive Performance Materials Inc., Waterford, N.Y.). SF1708 is an aminopropylaminoethylpolysiloxane which has a FGEW of 1,250 g/mol, a molecular weight from 25,000 to 30,000 Daltons, and a viscosity of 1250-2500 centipoise at 25° C.

In some embodiments, the aminosilicone polymer is KF-393, KF-859, KF-860, KF-861, KF-867, KF-869, KF-880, KF-8002, KF-8004, KF-8005, or KF-8021 (Shin-Etsu Chemical Co., Ltd, Tokyo, Japan). KF-393 has a FGEW of 350 g/mol, a viscosity of 70 mm$^2$/s, a specific gravity of 0.98, and a refractive index of 1.422, all at 25° C. KF-859 has a FGEW of 6,000 g/mol, a viscosity of 60 mm$^2$/s, a specific gravity of 0.96, and a refractive index of 1.403, all at 25° C. KF-860 has a FGEW of 7,600 g/mol, a viscosity of 250 mm$^2$/s, a specific gravity of 0.97, and a refractive index of 1.404, all at 25° C. KF-861 has a FGEW of 2,000 g/mol, a viscosity of 3,500 mm$^2$/s, a specific gravity of 0.98, and a refractive index of 1.408, all at 25° C. KF-867 has a FGEW of 1,700 g/mol, a viscosity of 1,300 mm$^2$/s, a specific gravity of 0.98, and a refractive index of 1.407, all at 25° C. KF-869 has a FGEW of 3,800 g/mol, a viscosity of 1,500 mm$^2$/s, a specific gravity of 0.97, and a refractive index of 1.405, all at 25° C. KF-880 has a FGEW of 1,800 g/mol, a viscosity of 650 mm$^2$/s, a specific gravity of 0.98, and a refractive index of 1.407, all at 25° C. KF-8002 has a FGEW of 1,700 g/mol, a viscosity of 1,100 mm$^2$/s, a specific gravity of 0.98, and a refractive index of 1.408, all at 25° C. KF-8004 has a FGEW of 1,500 g/mol, a viscosity of 800 mm$^2$/s, a specific gravity of 0.98, and a refractive index of 1.408, all at 25° C. KF-8005 has a FGEW of 11,000 g/mol, a viscosity of 1,200 mm$^2$/s, a specific gravity of 0.97, and a refractive index of 1.403, all at 25° C. KF-8021 has a FGEW of 55,000 g/mol, a viscosity of 15,000 mm$^2$/s, a specific gravity of 0.97, and a refractive index of 1.403, all at 25° C.

In some embodiments, the aminosilicone polymer is OFX-8417, BY 16-849, FZ-3785, BY 16-872, or BY 16-853

U (Dow Corning Toray Co., Ltd., Japan). OFX-8417 has a FGEW of 1,700 g/ml and a viscosity of 1,200 m²/s, all at 25° C. BY 16-849 has a FGEW of 600 g/ml and a viscosity of 1,200 m²/s, all at 25° C. FZ-3785 has a FGEW of 6,000 g/ml and a viscosity of 3,500 m²/s, all at 25° C. BY 16-872 has a FGEW of 1,800 g/ml and a viscosity of 18,100 m²/s, all at 25° C. BY 16-853 has a FGEW of 450 g/ml and a viscosity of 14 m²/s, all at 25° C.

In some embodiments, the aminosilicone polymer is an amine-terminated aminosilicone such as DMS-A11, DMS-A12, DMS-A15, DMS-A21, DMS-A31, DMS-A32, DMS-A35, DMS-A211, or DMS-A214 (Gelest, Inc., Morrisville, Pa.). In some embodiments, the aminosilicone polymer has a pendant amine functionality such as AMS-132, AMS-152, AMS-162, AMS-233, AMS-242, ATM-1112, ATM-1322, UBS-0541, or UBS-0822 (Gelest, Inc., Morrisville, Pa.).

In some embodiments, the aminosilicone polymer is an amine-terminated aminosilicone such as GP-657, GP-RA-157, GP-34, GP-397, GP-145, GP-871, or GP-846 (Genesee Polymers, Flint, Mich.). In some embodiments, the aminosilicone polymer has a pendant amine functionality such as GP-4, GP-6, GP-581, GP-344, GP-342, GP-316, or GP-345 (Genesee Polymers, Flint, Mich.).

In some embodiments, the aminosilicone polymer can be prepared using methods known to one of skill in the art. In some embodiments, the aminosilicone polymer is prepared using the methods disclosed in U.S. Pat. No. 9,139,770, incorporated herein by reference in its entirety.

In some embodiments, the aminosilicone polymer has a waxy component and an amine binding component. The waxy component can be any solubilizing or hydrophobic group. In some embodiments, the solubilizing or hydrophobic group can be a long-chain alkyl group, a long-chain alkenyl group, a long-chain alkynyl group, a cycloalkyl, or an aryl. In some embodiments, the solubilizing or hydrophobic group can be a $C_{8-20}$ alkyl, a $C_{8-20}$ alkenyl, a $C_{8-20}$ alkynyl, a $C_{3-12}$ cycloalkyl, or a $C_{6-16}$ aryl.

In some embodiments, the solubilizing group or waxy component can be a long-chain alkyl. In some embodiments, each long-chain alkyl group can be octyl, nonyl, decyl, undecyl, dodecyl, tridecyl, tetradecyl, pentadecyl, hexadecyl, heptadecyl, octadecyl, nonadecyl, or icosyl. In some embodiments, each long-chain alkyl group can be hexadecyl, heptadecyl, octadecyl, nonadecyl, or icosyl. In some embodiments, each long-chain alkyl group can be hexadecyl, octadecyl, or icosyl. In some embodiments, each long-chain alkyl group can be octadecyl. The long-chain alkyl group can be linear or branched, and optionally substituted.

In some embodiments, the aminosilicone polymer contains a plurality of monomer repeat units. In some embodiments, the aminosilicone polymer contains a plurality of amine binding groups each covalently attached to one of the monomer repeat units, thereby forming a first population of monomer repeat units. In some embodiments, the aminosilicone polymer also includes a plurality of solubilizing groups each covalently attached to one of the monomer repeat units, thereby forming a second population of monomer repeat units.

In some embodiments, the aminosilicone polymer includes a plurality of alkylamine binding groups each covalently attached to one of the monomer repeat units, thereby forming a first population of monomer repeat units. In some embodiments, the aminosilicone polymer also includes a plurality of solubilizing or hydrophobic groups each covalently attached to one of the monomer repeat units, thereby forming a second population of monomer repeat units.

The aminosilicone polymer can have any suitable number of monomer repeat units.

In some embodiments, the aminosilicone polymer can include between about 5 to about 100, about 5 to about 50, about 5 to about 40, about 5 to about 30, about 5 to about 20, about 5 to about 10, about 10 to about 100, about 10 to about 50, about 10 to about 40, about 10 to about 30, about 10 to about 20, about 20 to about 100, about 20 to about 50, about 20 to about 40, about 20 to about 30, about 30 to about 100, about 30 to about 50, about 30 to about 40, about 40 to about 100, about 40 to about 50, or about 50 to about 100 monomer repeat units. In some embodiments, the aminosilicone polymer can include about 5, 10, 15, 20, 25, 30, 40, 50, 60, 70, 80, 90 or 100 monomer repeat units.

When there are at least two types of monomer repeat units, one type of monomer repeat can be present in a greater amount relative to the other types of monomer repeat units. Alternatively, the different types of monomer repeat units can be present in about the same amount. In some embodiments, the first population of monomer repeat units is about the same number as the second population of monomer repeat units.

Each monomer repeat unit can be the same or different. In some embodiments, there are at least two types of monomer repeat units in the aminosilicone polymer. In some embodiments, the aminosilicone polymer includes at least two types of monomer repeat units where a first type includes a long-chain alkyl group and a second type includes an alkylamine binding group. Other types of monomer repeat units can also be present. The aminosilicone polymer of the present invention can include 1, 2, 3, 4, or more different kinds of monomer repeat units. In some embodiments, the aminosilicone polymers of the present invention have a single type of monomer repeat unit. In some embodiments, the aminosilicone polymers of the present invention have two different types of monomer repeat units.

In some embodiments, each monomer repeat unit is covalently linked to both the amine binding group and the long-chain alkyl group, such that the first and second populations of monomer repeat units are the same.

In some embodiments, each monomer repeat unit is covalently linked to both the alkylamine binding group and the long-chain alkyl group, such that the first and second populations of monomer repeat units are the same.

In some embodiments, the aminosilicone polymer has the structure of formula I:

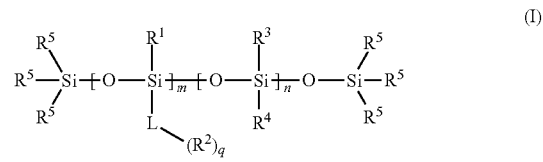

wherein each $R^1$ can independently be $C_{1-20}$ alkyl, $C_{1-20}$ heteroalkyl, $C_{2-20}$ alkenyl, $C_{2-20}$ alkynyl, cycloalkyl, or aryl, each optionally substituted with one or more —Si$(R^{1a})_3$ groups; each $R^{1a}$ can independently be $C_{1-6}$ alkyl, cycloalkyl, or aryl; each L can independently be $C_{3-8}$ alkylene, $C_{3-8}$ heteroalkylene, $C_{3-8}$ alkylene-O—$C_{2-8}$ alkylene, $C_{3-8}$ alkylene-(C(O)NH—$C_{2-8}$ alkylene)$_q$, $C_{3-8}$ heteroalkylene-(C(O)NH—$C_{2-8}$ alkylene)$_q$, or $C_{3-8}$ alkylene-O—$C_{3-8}$ alkylene-(C(O)NH—C$_{2-8}$ alkylene)$_q$; each R$^2$ can independently be NR$^{2a}$R$^{2b}$ or C(O)OH, wherein at least one R$^2$ is NR$^{2a}$R$^{2b}$; each of R$^{2a}$ and R$^{2b}$ can independently be H or C$_{1-6}$ alkyl; each R$^3$ can independently be C$_{1-20}$ alkyl, C$_{2-20}$ alkenyl, C$_{2-20}$ alkynyl, cycloalkyl, or aryl; each R$^4$ can independently be C$_{8-20}$ alkyl, C$_{8-20}$ heteroalkyl, cycloalkyl, or aryl, each optionally substituted with one or more —Si(R$^{1a}$)$_3$ groups; each R$^5$ can independently be C$_{1-20}$ alkyl, C$_{2-20}$ alkenyl, C$_{2-20}$ alkynyl, -L-(R$^2$)$_q$, cycloalkyl, or aryl; subscript m is an integer from 5 to 50; subscript n is an integer from 0 to 50; and subscript q is an integer from 1 to 10, wherein when subscript n is 0, then R$^1$ can be C$_{8-20}$ alkyl, C$_{8-20}$ heteroalkyl, C$_{8-20}$alkenyl, C$_{8-20}$ alkynyl, cycloalkyl, or aryl, each optionally substituted with one or more —Si(R$^{1a}$)$_3$ groups.

In some embodiments, wherein each R$^1$ can independently be C$_{1-20}$ alkyl, C$_{1-20}$ heteroalkyl, C$_{2-20}$ alkenyl, C$_{2-20}$ alkynyl, cycloalkyl, or aryl; each R$^{1a}$ can independently be C$_{1-6}$ alkyl, cycloalkyl, or aryl; each L can independently be C$_{3-8}$ alkylene; each R$^2$ can independently be NR$^{2a}$R$^{2b}$ or C(O)OH, wherein at least one R$^2$ is NR$^{2a}$R$^{2b}$; each of R$^{2a}$ and R$^{2b}$ can independently be H or C$_{1-6}$ alkyl; each R$^3$ can independently be C$_{1-20}$ alkyl, C$_{2-20}$ alkenyl, C$_{2-20}$ alkynyl, cycloalkyl, or aryl; each R$^4$ can independently be C$_{8-20}$ alkyl, C$_{8-20}$ heteroalkyl, cycloalkyl, or aryl; each R$^5$ can independently be C$_{1-20}$ alkyl, C$_{2-20}$ alkenyl, C$_{2-20}$ alkynyl, -L-(R$^2$)$_q$, cycloalkyl, or aryl; subscript m is an integer from 5 to 50; subscript n is an integer from 0 to 50; and subscript q is an integer from 1 to 10, wherein when subscript n is 0, then R$^1$ can be C$_{8-20}$ alkyl, C$_{8-20}$ heteroalkyl, C$_{8-20}$alkenyl, C$_{8-20}$alkynyl, cycloalkyl, or aryl.

Radical L can be any suitable linker to link the binding group R$^2$ to the siloxane polymer. In some embodiments, each L can independently be C$_{3-8}$ alkylene, C$_{3-8}$ alkylene-O—C$_{2-8}$ alkylene, C$_{3-8}$ alkylene-(C(O)NH—C$_{2-8}$ alkylene)$_2$, or C$_{3-8}$ alkylene-O—C$_{1-8}$ alkylene-(C(O)NH—C$_{2-8}$ alkylene)$_3$. In other embodiments, each L can independently be C$_{3-8}$ alkylene. In some other embodiments, each L can independently be propylene, butylene, pentylene, n-propylene-O-i-propylene, or pentylene-(C(O)NH-ethylene)$_2$. In still other embodiments, each L can independent be propylene, butylene, or pentylene.

The binding group, R$^2$, can be any suitable amine or carboxylic acid. For example, R$^2$ can be a primary amine where both of R$^{2a}$ and R$^{2b}$ are H. Alternatively, R$^2$ can be a secondary amine where one of R$^{2a}$ and R$^{2b}$ is H and the other is C$_{1-6}$ alkyl. Representative secondary amines include, but are not limited to, those where R$^{2a}$ is methyl, ethyl, propyl, isopropyl, butyl, or pentyl. Tertiary amines, where each of R$^{2a}$ and R$^{2b}$ is C$_{1-6}$ alkyl, are also useful as the binding group R$^2$. In embodiments where each of R$^{2a}$ and R$^{2b}$ is C$_{1-6}$ alkyl, the R$^{2a}$ and R$^{2b}$ can be the same or different. In some embodiments, the tertiary amine is a —N(CH$_3$)$_2$, —N(CH$_2$CH$_3$)$_2$, —N(CH$_2$CH$_2$CH$_3$)$_2$, —N(CH$_3$)(CH$_2$CH$_3$), —N(CH$_3$)(CH$_2$CH$_2$CH$_3$), or —N(CH$_2$CH$_3$)(CH$_2$CH$_2$CH$_3$).

In some embodiments, each -L-(R$^2$)$_q$ group can independently be C$_{3-8}$ alkylene-(R$^2$)$_{1-3}$, C$_{3-8}$ heteroalkylene-R$^2$, or C$_{3-8}$ alkylene-(C(O)NH—C$_{2-8}$ alkylene-R$^2$)$_2$. In some embodiments, each L-(R$^2$)$_q$ group can independently be C$_{3-8}$ alkylene-C(O)OH, C$_{3-8}$ alkylene-(C(O)OH)$_2$, C$_{3-8}$ alkylene-O—C$_{2-8}$ alkylene-(C(O)OH)$_3$, C$_{3-8}$ alkylene-NR$^{2a}$R$^{2b}$, or C$_{3-8}$ alkylene-(C(O)NH—C$_{2-8}$ alkylene-NR$^{2a}$R$^{2b}$)$_2$. In some embodiments, each L-(R$^2$)$_q$ group can independently be C$_{3-8}$ alkylene-C(O)OH, C$_{3-8}$ alkylene-(C(O)OH)$_2$, or C$_{3-8}$ alkylene-NR$^{2a}$R$^{2b}$. In some embodiments, each L-(R$^2$)$_q$ group can independently be:

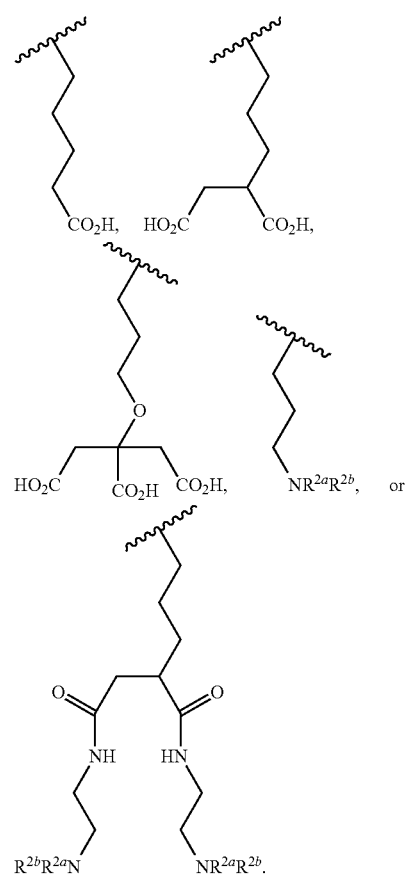

In some embodiments, each L-(R$^2$)$_q$ group can independently be:

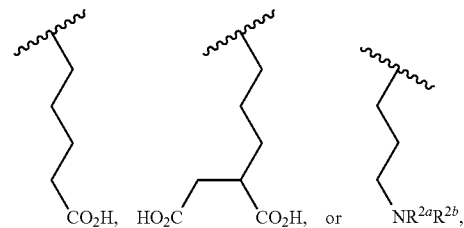

One of radicals R$^1$ and R$^4$ can be the solubilizing ligand. When subscript n is 0, R$^1$ can be the solubilizing ligand. When subscript n is greater than 1, either of R$^1$ and R$^4$ can be the solubilizing ligand. Any suitable solubilizing ligand can be used in the present invention. In some embodiments, at least one of R$^1$ and R$^4$ can be C$_{8-20}$ alkyl or C$_{8-20}$ heteroalkyl, wherein each alkyl group is optionally substituted with one —Si(R$^{1a}$)$_3$ group. In some embodiments, at least one of R$^1$ and R$^4$ can be C$_{8-20}$ alkyl or C$_{8-20}$ heteroalkyl. In some embodiments, at least one of R$^1$ and R$^4$ can be C$_{16}$ alkyl, C$_{18}$ alkyl, C$_{20}$ alkyl, or —(CH$_2$)$_2$—(OCH$_2$CH$_2$)$_3$—OCH$_3$, wherein each alkyl group is optionally substituted with one —Si(R$^{1a}$)$_3$ group. In some embodiments, at least one of R$^1$ and R$^4$ can be C$_{16}$ alkyl, C$_{18}$ alkyl, C$_{20}$ alkyl, or —(CH$_2$)$_2$—(OCH$_2$CH$_2$)$_3$—OCH$_3$.

When the alkyl group of R$^1$ or R$^4$ is substituted with the —Si(R$^{1a}$)$_3$ group, the substitution can be at any point on the alkyl group, including the terminal carbon, or any other carbon in the alkyl chain. The alkyl group can be branched or unbranched. The $R^{1a}$ group can be any suitable group that promotes solubilization of the siloxane polymer. For example, each $R^{1a}$ can independently be $C_{1-6}$ alkyl, cycloalkyl, or aryl. Each $R^{1a}$ can be the same or different. In some embodiments, each $R^{1a}$ can independently be $C_{1-6}$ alkyl. The alkyl groups of $R^{1a}$ can be branched or unbranched. In some embodiments, the alkyl groups of $R^{1a}$ are methyl, ethyl, or propyl. In some embodiments, each $R^{1a}$ can be ethyl.

Radical $R^3$ can be any suitable group. In some embodiments, each $R^3$ can independently be $C_{1-20}$ alkyl, $C_{2-20}$ alkenyl, $C_{2-20}$ alkynyl, cycloalkyl, or aryl. In some embodiments, each $R^3$ can independently be $C_{1-20}$ alkyl. In some embodiments, each $R^3$ can independently be $C_{1-6}$ alkyl. In some embodiments, each $R^3$ can independently be $C_{1-3}$ alkyl. In some embodiments, each $R^3$ can independently be methyl, ethyl, or propyl. In some embodiments, each $R^3$ can be methyl.

$R^5$ can be any suitable group. In some embodiments, each $R^5$ can independently be $C_{1-20}$ alkyl, $C_{2-20}$ alkenyl, $C_{2-20}$ alkynyl, -L-$(R^2)_q$, cycloalkyl, or aryl. In some embodiments, each $R^5$ can independently be $C_{1-20}$ alkyl. In some embodiments, each $R^5$ can independently be $C_{1-6}$ alkyl. In some embodiments, each $R^5$ can independently be $C_{1-3}$ alkyl. In some embodiments, each $R^5$ can independently be methyl, ethyl, or propyl. In some embodiments, each $R^5$ can be methyl.

Alternatively, $R^5$ can be an amine or carboxy binding group, or a solubilizing group. In some embodiments, at least one $R^5$ can be -L-$(R^2)_q$, as defined above. In some embodiments, at least one $R^5$ can be $C_{8-20}$ alkyl. In some embodiments, at least one $R^5$ can be $C_{12-20}$ alkyl. In some embodiments, at least one $R^5$ can be octadecyl.

When the aminosilicone polymers of the present invention have two types of monomer repeat units, such that subscript n is not 0, the structure can be the structure of formula I, wherein each $R^5$ can independently be $C_{1-20}$ alkyl, $C_{2-20}$ alkenyl, $C_{2-20}$ alkynyl, cycloalkyl, or aryl; subscript m can be an integer from 5 to 50; and subscript n can be an integer from 1 to 50. In some embodiments, $R^1$ can independently be $C_{1-3}$ alkyl. In some embodiments, the alkyl groups of $R^4$ can be $C_{8-20}$ alkyl, $C_{12-20}$ alkyl, $C_{14-20}$ alkyl, $C_{16-20}$ alkyl, or $C_{18-20}$ alkyl.

In some embodiments, each $R^5$ can independently be $C_{1-20}$ alkyl, $C_{2-20}$ alkenyl, $C_{2-20}$ alkynyl, cycloalkyl, or aryl; subscript m can be an integer from 5 to 50; and subscript n can be 0. In some embodiments, each $R^1$ can independently be $C_{8-20}$ alkyl or $C_{8-20}$ heteroalkyl, wherein the alkyl group can optionally be substituted with one —Si$(R^{1a})_3$ group; each $R^{1a}$ can independently be $C_{1-6}$ alkyl; each $R^5$ can independently be $C_{1-3}$ alkyl; and subscript q can be an integer from 1 to 3. In still other embodiments, each $R^1$ can independently be $C_{8-20}$ alkyl or $C_{8-20}$ heteroalkyl; each $R^{1a}$ can independently be $C_{1-6}$ alkyl; each $R^5$ can independently be $C_{1-3}$ alkyl; and subscript q can be an integer from 1 to 3.

Any suitable number of subscripts m and n can be present in the aminosilicone polymers of the present invention. For example, the number of subscripts m and n can be from about 1 to about 100, from about 1 to about 80, from about 1 to about 60, from about 1 to about 40, from about 1 to about 20, from about 1 to about 10, from about 5 to about 100, from about 5 to about 80, from about 5 to about 60, from about 5 to about 40, from about 5 to about 20, from about 5 to about 10, from about 10 to about 100, from about 10 to about 80, from about 10 to about 60, from about 10 to about 40, from about 10 to about 20, from about 20 to about 100, from about 20 to about 80, from about 20 to about 60, from about 20 to about 40, from about 40 to about 100, from about 40 to about 80, from about 40 to about 60, from about 60 to about 100, from about 60 to about 80, or from about 80 to about 100. Alternatively, the number of subscripts m and n can be about 5, 10, 15, 20, 25, 30, 40, 50, 60, 70, 80, 90, or 100.

Any suitable ratio of subscripts m and n can be present in the quantum dot binding-ligands of the present invention. When m and n are both greater than 0, the ratio of subscript m to n can be about 100:1, 90:1, 80:1, 75:1, 70:1, 60:1, 50:1, 40:1, 30:1, 25:1, 20:1, 15:1 10:1, 5:1, 4:1, 3:1, 2.5:1 2:1, 1:1, 1:2, 1:2.5, 1:3, 1:4, 1:5, 1:10, 1:15, 1:20, 1:25, 1:30, 1:40, 1:50, 1:60, 1:70, 1:75, 1:80, 1:90 or 1:100. In some embodiments, the ratio of subscript m to subscript n is from about 1:100 to about 1:1. In some embodiments, the ratio of subscript m to subscript n is from about 1:100 to about 1:10. In some embodiments, the ratio of subscript m to subscript n is from about 1:50 to about 1:10. In some embodiments, the ratio of subscript m to subscript n is about 1:20.

In some embodiments, $R^1$ and $R^3$ can each independently be $C_{1-3}$ alkyl; each $R^{1a}$ can independently be $C_{1-6}$ alkyl; each $R^4$ can independently be $C_{8-20}$ alkyl or $C_{8-20}$ heteroalkyl, wherein the alkyl group can optionally be substituted with one —Si$(R^{1a})_3$ group; each $R^5$ can independently be $C_{1-3}$ alkyl; and subscript q can be an integer from 1 to 3.

In some embodiments, wherein $R^1$, $R^3$, and $R^5$ are methyl and subscript n is other than 0, the aminosilicone polymer of formula I has the structure of formula Ia:

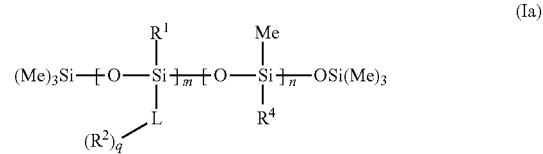

(Ia)

wherein subscript m is an integer from 5 to 14, subscript n is an integer from 1 to 14, $R^2$ is $NR^{2a}R^{2b}$, and L, q, $R^{2a}$, $R^{2b}$, and $R^4$ are as defined for formula I.

In some embodiments, the aminosilicone polymer of formula Ia has the following structure:

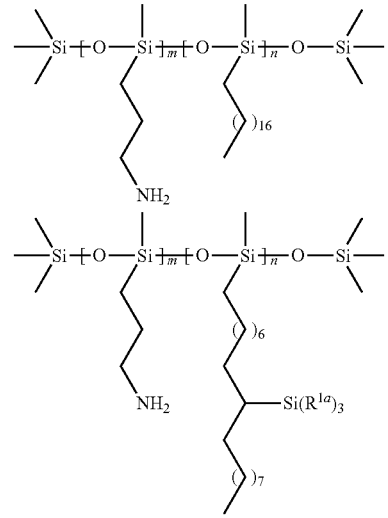

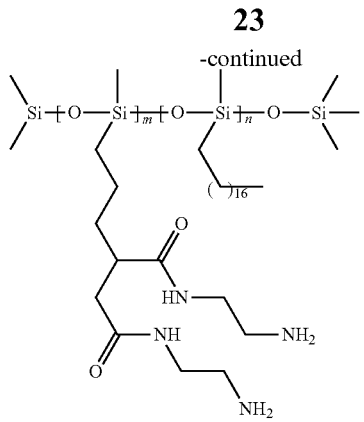

wherein subscript m is an integer from 10 to 14, subscript n is an integer from 1 to 14, and $R^{1a}$ is as defined for formula I.

In some embodiments, the aminosilicone polymer of formula Ia has the following structure:

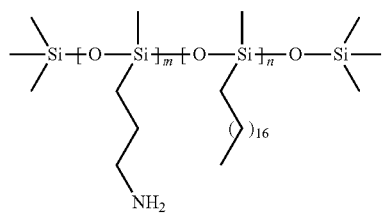

wherein subscript m is an integer from 10 to 14 and subscript n is an integer from 1 to 14.

In some embodiments, where $R^5$ is methyl and subscript n is 0, the aminosilicone polymer of formula I has the structure of formula Ib:

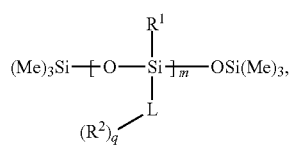

(Ib)

wherein $R^2$ is $NR^{2a}R^{2b}$, and L, m, q, $R^1$, $R^{2a}$, and $R^{2b}$ are as defined for formula I.

In some embodiments, $R^1$ can be $C_{8-20}$ alkyl. In some embodiments, the aminosilicone polymer of formula Ib has the following structure:

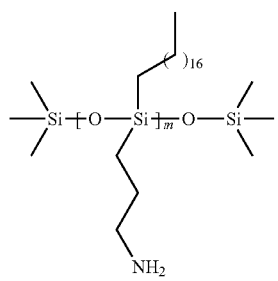

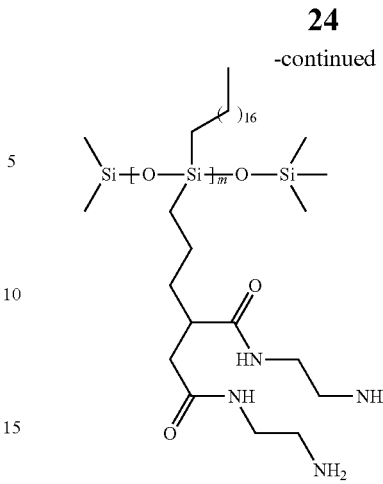

wherein subscript m is an integer from 5 to 50.

In some embodiments, where -L-$(R^2)_q$ is $C_{3-8}$ alkylene-$NR^{2a}R^{2b}$ the aminosilicone polymer of formula I has the structure of formula Ic:

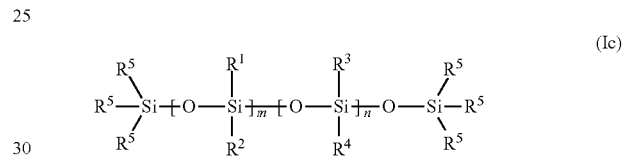

(Ic)

wherein each $R^1$ can independently be $C_{1-20}$ alkyl, $C_{2-20}$ alkenyl, $C_{2-20}$ alkynyl, cycloalkyl, or aryl, wherein the alkyl group is optionally substituted with one —Si$(R^{1a})_3$ group; each $R^2$ can independently be $C_{3-8}$ alkylene-$NR^{2a}R^{2b}$; each of $R^{2a}$ and $R^{2b}$ can independently be H or $C_{1-6}$ alkyl; each $R^3$ can independently be $C_{1-20}$ alkyl, $C_{2-20}$ alkenyl, $C_{2-20}$ alkynyl, cycloalkyl, or aryl; each $R^4$ can independently be $C_{8-20}$ alkyl; each $R^5$ can independently be $C_{1-20}$ alkyl, $C_{2-20}$ alkenyl, $C_{2-20}$ alkynyl, $C_{3-8}$ alkylene cycloalkyl, or aryl; subscript m can be an integer from 5 to 50; and subscript n can be an integer from 0 to 50; wherein when subscript n is 0, then $R^1$ can be $C_{8-20}$ alkyl, $C_{8-20}$ alkenyl, $C_{8-20}$ alkynyl, cycloalkyl, or aryl. In some embodiments, the alkyl groups of $R^1$ or $R^4$ can be $C_{8-20}$ alkyl, $C_{12-20}$ alkyl, $C_{14-20}$ alkyl, $C_{16-20}$ alkyl, or $C_{18-20}$ alkyl.

Radical $R^5$ can be any suitable group. In some embodiments, each $R^5$ can independently be $C_{1-20}$ alkyl, $C_{2-20}$ alkenyl, $C_{2-20}$ alkynyl, $C_{3-8}$ alkylene-$NR^{2a}R^{2b}$, cycloalkyl, or aryl. In some embodiments, each $R^5$ can independently be $C_{1-20}$ alkyl, $C_{2-20}$ alkenyl, $C_{2-20}$ alkynyl, cycloalkyl, or aryl. In some embodiments, each $R^5$ can be $C_{1-20}$ alkyl. In some embodiments, each $R^5$ can be $C_{8-20}$ alkyl. In some embodiments, each $R^5$ can be octadecyl. In some embodiments, each $R^5$ can be $C_{1-3}$ alkyl. In some embodiments, each $R^5$ can independently be methyl, ethyl, or propyl. In some embodiments, each $R^5$ can be aryl. In some embodiments, each $R^5$ can be phenyl. In some embodiments, each $R^5$ can be $C_{3-8}$ alkylene-$NR^{2a}R^{2b}$. In some embodiments, each $R^5$ can be $C_3$ alkylene-$NR^{2a}R^{2b}$. In some embodiments, each $R^5$ can independently be octadecyl or $C_3$ alkylene-$NR^{2b}R^{2b}$.

In some embodiments, where $R^2$ is $(CH_2)_p$ $CH_2CH_2NR^{2a}R^{2b}$, the aminosilicone polymer of formula Ic can have the structure of formula Id:

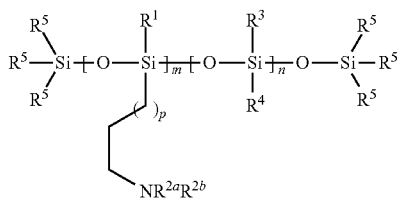

(Id)

wherein $R^1$, $R^{2a}$, $R^{2b}$, $R^3$, $R^4$, and $R^5$ are as defined above for formula Ic, subscripts m and n are each an integer from 10 to 14, and subscript p is an integer from 1 to 6.

In some embodiments, where $R^1$, $R^3$, and $R^5$ are methyl, $R^4$ is $C^8$ alkylene, and $R^2$ is $(CH_2)_pCH_2CH_2NR^{2a}R^{2b}$, the aminosilicone polymer of formula Ic can have the structure of formula Ie:

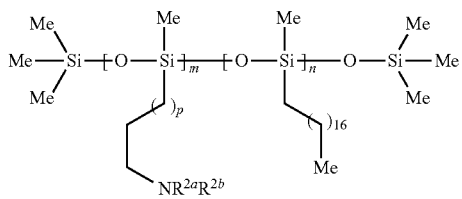

(Ie)

wherein $R^{2a}$ and $R^{2b}$ are as defined above for formula Ic, subscripts m and n are each an integer from 10 to 14, and subscript p is an integer from 1 to 6.

When the aminosilicone polymer of the present invention has a single type of monomer repeat unit, such that subscript n is 0, the structure can be the structure of formula I, wherein each $R^1$ can independently be $C_{8-20}$ alkyl, $C_{8-20}$ alkenyl, $C_{8-20}$ alkynyl, cycloalkyl, or aryl. In some embodiments, each $R^1$ can independently be $C_{8-20}$ alkyl; subscript m can be an integer from 5 to 50; and subscript n can be 0.

In some embodiments, where n is 0, the aminosilicone polymer of formula Ic can have the structure of formula If:

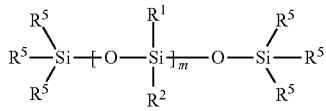

(If)

wherein $R^1$, $R^2$, and $R^5$ are as defined above for formula Ic and subscript m is an integer from 10 to 14.

In some embodiments, where subscript n is 0 and $R^2$ is $(CH_2)_pCH_2CH_2NR^{2a}R^{2b}$, the aminosilicone polymer of formula Ic can have the structure of formula Ig:

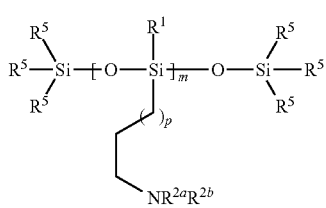

(Ig)

wherein $R^1$, $R^{2a}$, $R^{2b}$, and $R^5$ are as defined above for formula Ic, subscript m is an integer from 10 to 14, and subscript p is an integer from 1 to 6. In some embodiments, subscript p can be 1, 2, 3, 4, 5, or 6. In some embodiments, subscript p can be 1.

In some embodiments, where subscript n is 0, $R^1$ is $C_{18}$ alkyl, $R^2$ is $CH_2CH_2CH_2NR^{2a}R^{2b}$, and $R^5$ is methyl, the aminosilicone polymer of formula Ic can have the structure of formula Ih:

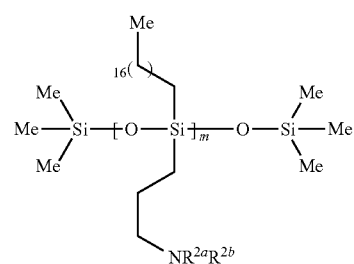

(Ih)

wherein $R^{2a}$ and $R^{2b}$ are as defined above for formula Ic and subscript m is an integer from 10 to 14.

In some embodiments, where subscript n is 0, $R^1$ and $R^5$ are $C_{18}$ alkyl, and $R^2$ is $CH_2CH_2CH_2NR^{2a}R^{2b}$, the aminosilicone polymer of formula Ic can have the structure of formula Ii:

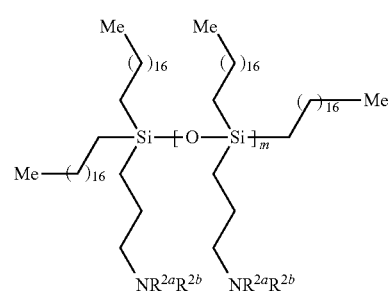

(Ii)

Whether the aminosilicone polymer is obtained from a commercial source or prepared de novo, the aminosilicone polymer can be of any suitable molecular weight, glass transition temperature, and viscosity.

The aminosilicone polymer can have any suitable molecular weight. In some embodiments, the aminosilicone polymer has a molecular weight of between about 1000 Daltons (Da) to about 20 kDa, about 1000 Da to about 10 kDa, about 1000 Da to about 5 kDa, about 1000 Da to about 2 kDa, about 2 kDa to about 20 kDa, about 2 kDa to about 10 kDa, about 2 kDa to about 5 kDa, about 5 kDa to about 20 kDa, about 5 kDa to about 10 kDa, or about 10 kDa to about 20 kDa.

Aminosilicone polymers typically have a low glass transition temperature and a low viscosity, depending on the size of the polymer and the groups pendant to the polymer backbone. In some embodiments, the aminosilicone polymers of the present invention can have a glass transition temperature of between about 1° C. to about 100° C., about 1° C. to about 60° C., about 1° C. to about 40° C., about 1° C. to about 20° C., about 10° C. to about 100° C., about 10° C. to about 60° C., about 10° C. to about 40° C., about 10° C. to about 20° C., about 20° C. to about 100° C., about 20°

C. to about 60° C., about 20° C. to about 40° C., about 40° C. to about 100° C., about 40° C. to about 60° C., or about 60° C. to about 100° C. In some embodiments, the aminosilicone polymer has a glass transition temperature of 90, 80, 70, 60, 50, 40, 30, 25, 20, 15, 10, 5, or 0° C. In some embodiments, the aminosilicone polymer can have a glass transition temperature of less than about 50° C. In other embodiments, the aminosilicone polymer can have a glass transition temperature of less than about 25° C.

In some embodiments, the aminosilicone polymer of the present invention can have any suitable viscosity. In some embodiments, the aminosilicone polymer has a viscosity of between about 1 centistokes (cSt) to about 5000 cSt, about 1 cSt to about 1000 cSt, about 1 cSt to about 500 cSt, about 1 cSt to about 100 cSt, about 1 cSt to about 50 cSt, about 1 cSt to about 10 cSt, about 1 cSt to about 5 cSt, about 5 cSt to about 5000 cSt, about 5 cSt to about 1000 cSt, about 5 cSt to about 500 cSt, about 5 cSt to about 100 cSt, about 5 cSt to about 50 cSt, about 5 cSt to about 10 cSt, about 10 cSt to about 5000 cSt, about 10 cSt to about 1000 cSt, about 10 cSt to about 500 cSt, about 10 cSt to about 100 cSt, about 10 cSt to about 50 cSt, about 50 cSt to about 5000 cSt, about 50 cSt to about 1000 cSt, about 50 cSt to about 500 cSt, about 50 cSt to about 100 cSt, about 100 cSt to about 5000 cSt, about 100 cSt to about 1000 cSt, about 100 cSt to about 500 cSt, about 500 cSt to about 5000 cSt, about 500 cSt to about 1000 cSt, or about 1000 cSt to about 5000 cSt.

In some embodiments, when the quantum dots are dispersed in the aminosilicone polymer, the resultant composition has a higher viscosity than the aminosilicone polymer alone.

In some embodiments, the quantum dot composition comprises at least one aminosilicone polymer. In some embodiments, the quantum dot composition comprises between 1 and 5, between 1 and 4, between 1 and 3, between 1 and 2, between 2 and 5, between 2 and 4, between 2 and 3, between 3 and 5, between 3 and 4, or between 4 and 5 aminosilicone polymers.

The aminosilicone polymer can be present in any suitable amount. For example, the aminosilicone polymer can be present in an amount that is more than, about the same as, or less than (weight/weight) compared to the quantum dots. In some embodiments, the weight ratio of aminosilicone polymer to quantum dots is about 1000:1 to about 1:1000, about 1000:1 to about 1:500, about 1000:1 to about 1:200, about 1000:1 to about 1:100, about 1000:1 to about 1:50, about 1000:1 to about 1:10, about 1000:1 to about 1:1, about 500:1 to about 1:1000, about 500:1 to about 1:500, about 500:1 to about 1:200, about 500:1 to about 1:100, about 500:1 to about 1:50, about 500:1 to about 1:10, about 500:1 to about 1:1, about 200:1 to about 1:1000, about 200:1 to about 1:500, about 200:1 to about 1:200, about 200:1 to about 1:100, about 200:1 to about 1:50, about 200:1 to about 1:10, about 200:1 to about 1:1, about 100:1 to about 1:1000, about 100:1 to about 1:500, about 100:1 to about 1:200, about 100:1 to about 1:100, about 100:1 to about 1:50, about 100:1 to about 1:10, about 100:1 to about 1:1, about 50:1 to about 1:1000, about 50:1 to about 1:500, about 50:1 to about 1:200, about 50:1 to about 1:100, about 50:1 to about 1:50, about 50:1 to about 1:10, about 50:1 to about 1:1, about 10:1 to about 1:1000, about 10:1 to about 1:500, about 10:1 to about 1:200, about 10:1 to about 1:100, about 10:1 to about 1:50, about 10:1 to about 1:10, about 10:1 to about 1:1. In some embodiments, the weight ratio of aminosilicone polymer to quantum dots is about 1000:1, about 500:1, about 200:1, about 100:1, about 50:1, about 10:1, about 1:1, about 1:10, about 1:50, about 1:100, about 1:200, about 1:500, or about 1:1000.

In some embodiments, the quantum dot composition comprises as a weight percent of the quantum dot composition (weight/weight) between about 0.01% to about 50%, about 0.01% to about 25%, about 0.01% to about 20%, about 0.01% to about 15%, about 0.01% to about 10%, about 0.01% to about 5%, about 0.01% to about 2%, about 0.01% to about 1%, about 1% to about 50%, about 1% to about 25%, about 1% to about 20%, about 1% to about 15%, about 1% to about 10%, about 1% to about 5%, about 1% to about 2%, about 2% to about 50%, about 2% to about 25%, about 2% to about 20%, about 2% to about 15%, about 2% to about 10%, about 2% to about 5%, 5% to about 50%, about 5% to about 25%, about 5% to about 20%, about 5% to about 15%, about 5% to about 10%, about 10% to about 50%, about 10% to about 25%, about 10% to about 20%, about 10% to about 15%, about 15% to about 50%, about 15% to about 25%, about 15% to about 20%, about 20% to about 50%, about 20% to about 25%, or about 25% to about 50% of the aminosilicone polymer.

In some embodiments, the quantum dot composition comprises as a weight percent of the quantum dot molded article (weight/weight) between about 0.01% to about 50%, about 0.01% to about 25%, about 0.01% to about 20%, about 0.01% to about 15%, about 0.01% to about 10%, about 0.01% to about 5%, about 0.01% to about 2%, about 0.01% to about 1%, about 1% to about 50%, about 1% to about 25%, about 1% to about 20%, about 1% to about 15%, about 1% to about 10%, about 1% to about 5%, about 1% to about 2%, about 2% to about 50%, about 2% to about 25%, about 2% to about 20%, about 2% to about 15%, about 2% to about 10%, about 2% to about 5%, 5% to about 50%, about 5% to about 25%, about 5% to about 20%, about 5% to about 15%, about 5% to about 10%, about 10% to about 50%, about 10% to about 25%, about 10% to about 20%, about 10% to about 15%, about 15% to about 50%, about 15% to about 25%, about 15% to about 20%, about 20% to about 50%, about 20% to about 25%, or about 25% to about 50% of the aminosilicone polymer.

Epoxy-Functional Silicone

In some embodiments, the quantum dot composition further comprises a epoxy-functional silicone.

In some embodiments, the epoxy-functional silicone has at least one epoxy functional group (e.g, an epoxycyclohexyl or epoxypropyl group). In some embodiments, an epoxy-functional silicone will have a siloxane backbone. A siloxane backbone is characterized by —Si—O—Si— and is represented by the general formula —Si($R^E{}_2$)O—, where the $R^E$ groups can be the same or different, and can be any suitable group, including, but not limited to, hydrogen, alkyl, heteroalkyl, alkylamine, carboxyalkyl, alkenyl, alkynyl, cycloalkyl, heterocycloalkyl, aryl, and heteroaryl. The siloxane backbone can be linear, branched, or cyclic. The siloxane backbone can include a single type of monomer repeat unit, forming a homopolymer. Alternatively, the siloxane backbone can include two or more types of monomer repeat units to form a copolymer that can be a random copolymer or a block copolymer.

In some embodiments, the epoxy-functional silicone is an epoxycyclohexyl silicone or an epoxypropyl silicone. In some embodiments, the epoxy-functional silicone has pendant reactive groups. In some embodiments, the epoxy-functional silicone has terminal reactive groups.

The epoxy-functional silicone can be linear or branched. In some embodiments, the epoxy-functional silicone is a linear epoxycyclohexyl silicone or a linear epoxypropyl silicone.

In some embodiments, the epoxy-functional silicone is formed from the polymerization of (i) monomers of the form —O—Si—$(R^F)_2$—O—, where $R^F$ is independently selected at each occurrence from lower alkyl groups, such as a methyl group at each occurrence, and (ii) monomers of the form $OSi(R^G)(R^H)O$, where $R^G$ is a lower alkyl group, such as a methyl, ethyl, or propyl, and $R^H$ is a epoxycyclohexyl-substituted alkyl group of the form —$(CH_2)_{1-6}$—$C_6H_9O$, —$(CH_2)_{24}$—$C_6H_9O$, or —$(CH_2)_2$—$C_6H_9O$ or a epoxy-propoxy-substituted alkyl group of the form —$(CH_2)_{1-6}$—$C_2H_4O$, —$(CH_2)_{24}$—$C_2H_4O$, or —$(CH_2)_3$—$C_2H_4O$.

In some embodiments, an epoxy-functional silicone is added to a composition comprising quantum dots and an aminosilicone polymer. In some embodiments, the epoxy-functional silicone cross-links with the aminosilicone polymer.

In some embodiments, the epoxy-functional silicone is a commercially available epoxy-functional silicone.

In some embodiments, the epoxy-functional silicone is an epoxy terminated polydimethylsiloxane of formula II:

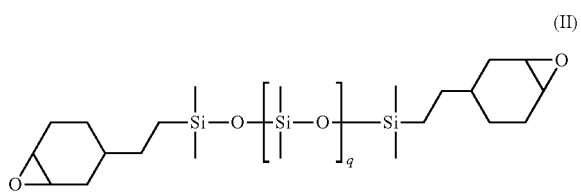

wherein q is a positive integer. In some embodiments, the compound of formula II has a molecular weight of 900-1000 (DMS-EC13) and is sold by Gelest, Morrisville, Pa.

In some embodiments, the epoxy-functional silicone is a pendant epoxy polydimethylsiloxane of formula III:

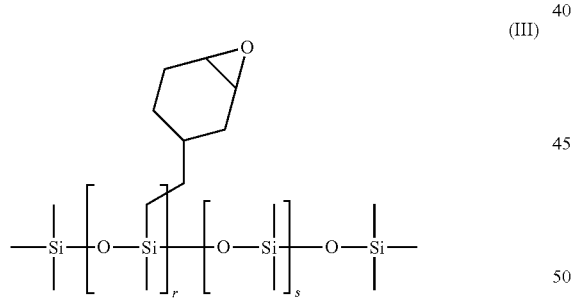

wherein r and s are positive integers. In some embodiments, the compound of formula III has a molecular weight of 18,000-20,000 (ECMS-227 and ECMS-327) or a molecular weight of 10,000-12,000 (ECMS-924) and is sold by Gelest, Morrisville, Pa. In some embodiments, the compound of formula III has a FGEW of 600 (X-22-2046) or a FGEW of 3,600 (KF-102) and is sold by Shin-Etsu (Tokyo, Japan).

In some embodiments, the epoxy-functional silicone is a (2-3% epoxycyclohexylethylmethyl siloxane)(10-15% methoxypolyalkyleneoxymethylsiloxane-(dimethylsiloxane) terpolymer with a molecular weight of 7,000-9,000 (EBP-234) sold by Gelest, Morrisville, Pa.

In some embodiments, the epoxy-functional silicone is a epoxypropoxypropyl terminated polydimethylsiloxane with a molecular weight of 363 (DMS-E09), a molecular weight of 500-600 (DMS-E11), a molecular weight of 1000-1400 (DMS-E12), or a molecular weight of 4500-5500 (DMS-E21) sold by Gelest, Morrisville, Pa.

In some embodiments, the epoxy-functional silicone is an (epoxyproxypropyl methylsiloxane)-(dimethylsiloxane) copolymer with a molecular weight of 7,000-9,000 (EMS-622) sold by Gelest, Morrisville, Pa.

In some embodiments, the epoxy-functional silicone is pendant epoxy polydimethylsiloxane of formula IV:

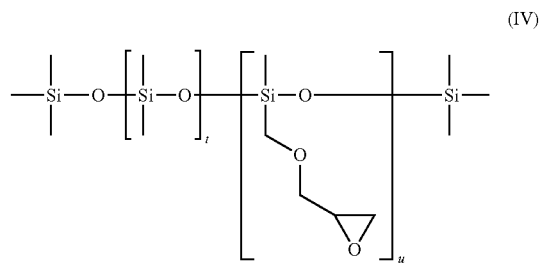

wherein: t is integer between 0 and 700; and u is an integer between 1 and 100. In some embodiments, t is 0 and u is 40 (GP-611); t is 10 and u is 30 (GP-555); t is 5 and u is 15 (GP-607); t is 42 and u is 84 (GP-585); t is 28 and u is 56 (GP-584); t is 30 and u is 30 (GP-514); t is 57 and u is 7 (GP-29); t is 97 and u is 6 (GP-32); t is 130 and u is 5 (GP-270); or t is 670 and u is 6 (GP-298) sold by Genesee Polymers, Flint, Mich.

In some embodiments, the epoxy-functional silicone is a pendant epoxy dimethylsiloxane of formula V:

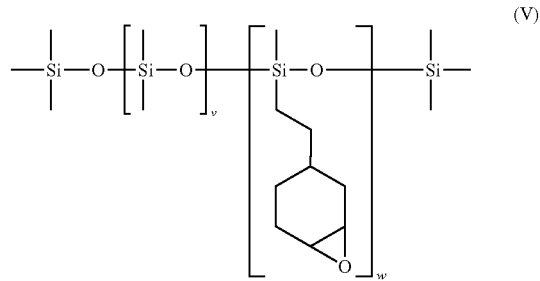

wherein: v is an integer between 1 and 200; and w is an integer between 1 and 5. In some embodiments, v is 192 and w is 3.5 (GP-712) sold by Genesee Polymers, Flint, Mich.

In some embodiments, the epoxy-functional silicone is an epoxy terminated polydimethylsiloxane of formula VI:

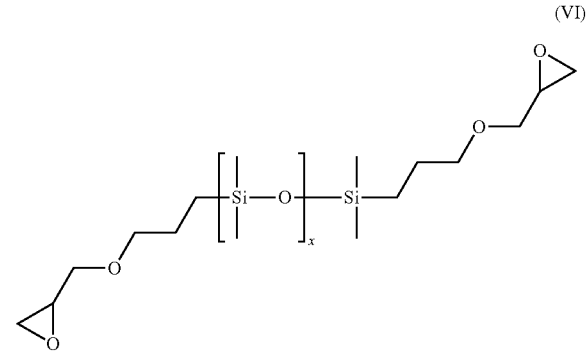

wherein x is an integer between 1 and 100. In some embodiments, x is 27 (GP-682) or x is 60 (GP-504) sold by Genesee Polymers, Flint, Mich.

In some embodiments, the epoxy-functional silicone is an epoxy terminated polydimethylsiloxone of formula VII:

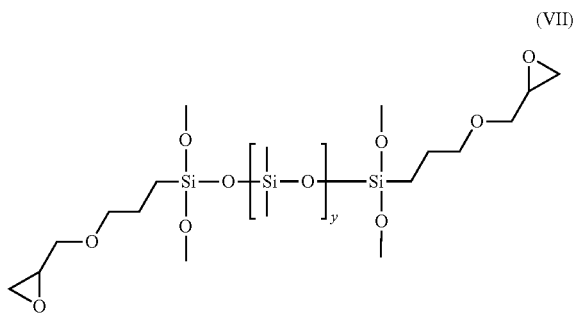

(VII)

wherein y is an integer between 1 and 100. In some embodiments, y is 46 (GP-502) sold by Genesee Polymers, Flint, Mich.

In some embodiments, the epoxy-functional silicone is an epoxy terminated polydimethylsiloxane of formula VIII:

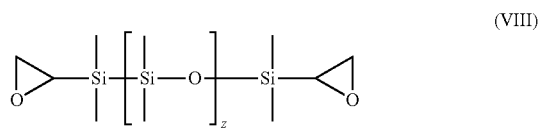

(VIII)

where z is an integer between 1 and 100. In some embodiments, where the FGEW is 200 g/mol the compound is X-22-163, where the FGEW is 490 g/mol the compound is KF-105, where the FGEW is 1,000 the compound is X-22-163A, where the FGEW is 1,800 the compound is X-22-163B, and where the FGEW is 2,700 the compound is X-22-63C, all sold by Shin-Etsu (Tokyo, Japan).

In some embodiments, the epoxy-functional silicone is an pendant epoxy polydimethylsiloxane of formula (IX):

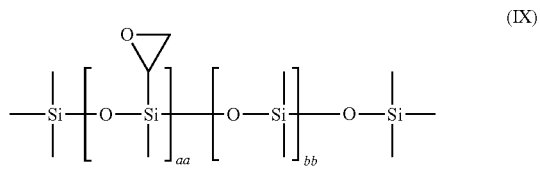

(IX)

where aa and bb are integers between 1 and 100. In some embodiments, where the FGEW is 350 g/mol the compound is KF-101, where the FGEW is 620 the compound is X-22-2000, where the FGEW is 525 the compound is X-22-343, and where the FGEW is 3,500 the compound is KF-1001, all sold by Shin-Etsu (Tokyo, Japan).

In some embodiments, the epoxy-functional silicone is EPON® 828 which has a FGEW of 185-192 g/mol sold by Momentive Performance Materials Inc., Waterford, N.Y.

Whether the epoxy-functional silicone is obtained from a commercial source or prepared de novo, the epoxy-functional silicone can be of any suitable molecular weight and viscosity.

The epoxy-functional silicone can have any suitable molecular weight. In some embodiments, the epoxy-functional silicone has a molecular weight of between about 100 Daltons (Da) to about 40 kDa, about 100 Da to about 20 kDa, about 100 Da to about 10 kDa, about 100 Da to about 5 kDa, about 100 Da to about 2 kDa, about 2 kDa to about 40 kDa, about 2 kDa to about 20 kDa, about 2 kDa to about 10 kDa, about 2 kDa to about 5 kDa, about 5 kDa to about 40 kDa, about 5 kDa to about 20 kDa, about 5 kDa to about 10 kDa, about 10 kDa to about 40 kDa, about 10 kDa to about 20 kDa, or about 20 kDa to about 40 kDa.

In some embodiments, the epoxy-functional silicone of the present invention can have any suitable viscosity. In some embodiments, the epoxy-functional silicone has a viscosity of between about 1 centistokes (cSt) to about 5000 cSt, about 1 cSt to about 1000 cSt, about 1 cSt to about 500 cSt, about 1 cSt to about 100 cSt, about 1 cSt to about 50 cSt, about 1 cSt to about 10 cSt, about 1 cSt to about 5 cSt, about 5 cSt to about 5000 cSt, about 5 cSt to about 1000 cSt, about 5 cSt to about 500 cSt, about 5 cSt to about 100 cSt, about 5 cSt to about 50 cSt, about 5 cSt to about 10 cSt, about 10 cSt to about 5000 cSt, about 10 cSt to about 1000 cSt, about 10 cSt to about 500 cSt, about 10 cSt to about 100 cSt, about 10 cSt to about 50 cSt, about 50 cSt to about 5000 cSt, about 50 cSt to about 1000 cSt, about 50 cSt to about 500 cSt, about 50 cSt to about 100 cSt, about 100 cSt to about 5000 cSt, about 100 cSt to about 1000 cSt, about 100 cSt to about 500 cSt, about 500 cSt to about 5000 cSt, about 500 cSt to about 1000 cSt, or about 1000 cSt to about 5000 cSt.

In some embodiments, the quantum dot composition comprises at least one epoxy-functional silicone. In some embodiments, the quantum dot composition comprises between 1 and 5, between 1 and 4, between 1 and 3, between 1 and 2, between 2 and 5, between 2 and 4, between 2 and 3, between 3 and 5, between 3 and 4, or between 4 and 5 epoxy-functional silicones.

The epoxy-functional silicone can be present in any suitable amount. For example, the epoxy-functional silicone can be present in an amount that is more than, about the same as, or less than (weight/weight) compared to the quantum dots. In some embodiments, the weight ratio of epoxy-functional silicone to quantum dots is about 1000:1 to about 1:1000, about 1000:1 to about 1:500, about 1000:1 to about 1:200, about 1000:1 to about 1:100, about 1000:1 to about 1:50, about 1000:1 to about 1:10, about 1000:1 to about 1:1, about 500:1 to about 1:1000, about 500:1 to about 1:500, about 500:1 to about 1:200, about 500:1 to about 1:100, about 500:1 to about 1:50, about 500:1 to about 1:10, about 500:1 to about 1:1, about 200:1 to about 1:1000, about 200:1 to about 1:500, about 200:1 to about 1:200, about 200:1 to about 1:100, about 200:1 to about 1:50, about 200:1 to about 1:10, about 200:1 to about 1:1, about 100:1 to about 1:1000, about 100:1 to about 1:500, about 100:1 to about 1:200, about 100:1 to about 1:100, about 100:1 to about 1:50, about 100:1 to about 1:10, about 100:1 to about 1:1, about 50:1 to about 1:1000, about 50:1 to about 1:500, about 50:1 to about 1:200, about 50:1 to about 1:100, about 50:1 to about 1:50, about 50:1 to about 1:10, about 50:1 to about 1:1, about 10:1 to about 1:1000, about 10:1 to about 1:500, about 10:1, to about 1:200, about 10:1 to about 1:100, about 10:1 to about 1:50, about 10:1 to about 1:10, about 10:1 to about 1:1. In some embodiments, the weight ratio of aminosilicone polymer to quantum dots is about 1000:1, about 500:1, about 200:1, about 100:1, about 50:1, about 10:1, about 1:1, about 1:10, about 1:50, about 1:100, about 1:200, about 1:500, or about 1:1000.

In some embodiments, the epoxy-functional silicone is present as a weight percent of the quantum dot composition (weight/weight) between about 0.01% to about 50%, about 0.01% to about 25%, about 0.01% to about 20%, about 0.01% to about 15%, about 0.01% to about 10%, about 0.01% to about 5%, about 0.01% to about 2%, about 0.01% to about 1%, about 1% to about 50%, about 1% to about 25%, about 1% to about 20%, about 1% to about 15%, about 1% to about 10%, about 1% to about 5%, about 1% to about 2%, about 2% to about 50%, about 2% to about 25%, about 2% to about 20%, about 2% to about 15%, about 2% to about 10%, about 2% to about 5%, 5% to about 50%, about 5% to about 25%, about 5% to about 20%, about 5% to about 15%, about 5% to about 10%, about 10% to about 50%, about 10% to about 25%, about 10% to about 20%, about 10% to about 15%, about 15% to about 50%, about 15% to about 25%, about 15% to about 20%, about 20% to about 50%, about 20% to about 25%, or about 25% to about 50%.

In some embodiments, the epoxy-functional silicone is present as a weight percent of the quantum dot molded article (weight/weight) between about 0.01% to about 50%, about 0.01% to about 25%, about 0.01% to about 20%, about 0.01% to about 15%, about 0.01% to about 10%, about 0.01% to about 5%, about 0.01% to about 2%, about 0.01% to about 1%, about 1% to about 50%, about 1% to about 25%, about 1% to about 20%, about 1% to about 15%, about 1% to about 10%, about 1% to about 5%, about 1% to about 2%, about 2% to about 50%, about 2% to about 25%, about 2% to about 20%, about 2% to about 15%, about 2% to about 10%, about 2% to about 5%, 5% to about 50%, about 5% to about 25%, about 5% to about 20%, about 5% to about 15%, about 5% to about 10%, about 10% to about 50%, about 10% to about 25%, about 10% to about 20%, about 10% to about 15%, about 15% to about 50%, about 15% to about 25%, about 15% to about 20%, about 20% to about 50%, about 20% to about 25%, or about 25% to about 50%.

Solvents

In some embodiments, the quantum dot composition further comprises a solvent. In some embodiments, the solvent is selected from the group consisting of formic acid, acetic acid, chloroform, acetone, butanone, fatty alcohol and ethylene glycol monomethyl ether, ethylene glycol monoethyl ether, ethylene glycol monopropyl ether, ethylene glycol monobutyl ether, diethylene glycol diethyl ether acetic acetate, methyl ethyl ketone, methyl isobutyl ketone, monomethyl ether glycol ester, gamma-butyrolactone, methylacetic-3-ethyl ether, butyl carbitol, butyl carbitol acetate, propanediol monomethyl ether, propanediol monomethyl ether acetate, cyclohexane, toluene, xylene, isopropyl alcohol, and combinations thereof.

Organic Resin

In some embodiments, the organic resin is a thermosetting resin or a ultraviolet (UV) curable resin. In some embodiments, the organic resin is cured with a method that facilitates roll-to-roll processing.

Thermosetting resins require curing in which they undergo an irreversible molecular cross-linking process which renders the resin infusible. In some embodiments, the thermosetting resin is an epoxy resin, a phenolic resin, a vinyl resin, a melamine resin, a urea resin, an unsaturated polyester resin, a polyurethane resin, an allyl resin, an acrylic resin, a polyamide resin, a polyamide-imide resin, a phenolamine condensation polymerization resin, a urea melamine condensation polymerization resin, or combinations thereof.

In some embodiments, the thermosetting resin is an epoxy resin. Epoxy resins are easily cured without evolution of volatiles or by-products by a wide range of chemicals. Epoxy resins are also compatible with most substrates and tend to wet surfaces easily. See Boyle, M. A., et al., "Epoxy Resins," Composites, Vol. 21, ASM Handbook, pages 78-89 (2001).

In some embodiments, the organic resin is a silicone thermosetting resin. In some embodiments, the silicone thermosetting resin is OE6630A or OE6630B (Dow Corning Corporation, Auburn, Mich.).

In some embodiments, a thermal initiator is used. In some embodiments, the thermal initiator is AIBN [2,2'-Azobis(2-methylpropionitrile)] or benzoyl peroxide.

UV curable resins are polymers that cure and quickly harden when exposed to a specific light wavelength. In some embodiments, the UV curable resin is a resin having as a functional group a radical-polymerization group such as a (meth)acrylyloxy group, a vinyloxy group, a styryl group, or a vinyl group; a cation-polymerizable group such as an epoxy group, a thioepoxy group, a vinyloxy group, or an oxetanyl group. In some embodiments, the UV curable resin is a polyester resin, a polyether resin, a (meth)acrylic resin, an epoxy resin, a urethane resin, an alkyd resin, a spiroacetal resin, a polybutadiene resin, or a thiolene resin.

In some embodiments, the UV curable resin is selected from the group consisting of urethane acrylate, allyloxylated cyclohexyl diacrylate, bis(acryloxy ethyl)hydroxyl isocyanurate, bis(acryloxy neopentylglycol)adipate, bisphenol A diacrylate, bisphenol A dimethacrylate, 1,4-butanediol diacrylate, 1,4-butanediol dimethacrylate, 1,3-butyleneglycol diacrylate, 1,3-butyleneglycol dimethacrylate, dicyclopentanyl diacrylate, diethyleneglycol diacrylate, diethyleneglycol dimethacrylate, dipentaerythritol hexaacrylate, dipentaerythritol monohydroxy pentaacrylate, di(trimethylolpropane) tetraacrylate, ethyleneglycol dimethacrylate, glycerol methacrylate, 1,6-hexanediol diacrylate, neopentylglycol dimethacrylate, neopentylglycol hydroxypivalate diacrylate, pentaerythritol diacrylate, pentaerythritol tetraacrylate, phosphoric acid dimethacrylate, polyethyleneglycol diacrylate, polypropyleneglycol diacrylate, tetraethyleneglycol diacrylate, tetrabromobisphenol A diacrylate, triethyleneglycol divinylether, triglycerol diacrylate, trimethylolpropane triacrylate, tripropyleneglycol diacrylate, tris(acryloxyethyl) isocyanurate, phosphoric acid triacrylate, phosphoric acid diacrylate, acrylic acid propargyl ester, vinyl terminated polydimethylsiloxane, vinyl terminated diphenylsiloxane-dimethylsiloxane copolymer, vinyl terminated polyphenylmethylsiloxane, vinyl terminated trifluoromethylsiloxane-dimethylsiloxane copolymer, vinyl terminated diethylsiloxane-dimethylsiloxane copolymer, vinylmethylsiloxane, monomethacryloyloxypropyl terminated polydimethyl siloxane, monovinyl terminated polydimethyl siloxane, monoallyl-mono trimethylsiloxy terminated polyethylene oxide, and combinations thereof.

In some embodiments, the UV curable resin is a mercapto-functional compound that can be cross-linked with an isocyanate, an epoxy, or an unsaturated compound under UV curing conditions. In some embodiments, the mercapto-functional compound is a polythiol. In some embodiments, the polythiol is pentaerythritol tetra(3-mercapto-propionate) (PETMP); trimethylol-propane tri(3-mercapto-propionate) (TMPMP); glycol di(3-mercapto-propionate) (GDMP); tris [25-(3-mercapto-propionyloxy)ethyl]isocyanurate (TEMPIC); dipentaerythritol hexa(3-mercapto-propionate) (Di-PETMP); ethoxylated trimethylolpropane tri(3-mercapto-propionate) (ETTMP 1300 and ETTMP 700); polycaprolactone tetra(3-mercapto-propionate) (PCL4MP 1350); pentaerythritol tetramercaptoacetate (PETMA); trimethylol-propane trimercaptoacetate (TMPMA); or glycol dimercaptoacetate (CDMA). These compounds are sold under the trade name THIOCURE® by Bruno Bock, Marschacht, Germany.

In some embodiments, the UV curable resin comprises a mercapto-functional compound and a methacrylate, an acrylate, an isocyanate, or combinations thereof. In some embodiments, the UV curable resin comprises a polythiol and a methacrylate, an acrylate, an isocyanate, or combinations thereof.

In some embodiments, the UV curable resin further comprises a photoinitiator. A photoinitiator initiates the curing reaction of the photosensitive material during exposure to light. In some embodiments, the photoinitiator is acetophenone-based, benzoin-based, or thioxanthenone-based.

In some embodiments, the photoinitiator is MINS-311RM (Minuta Technology Co., Ltd, Korea).

In some embodiments, the photoinitiator is IRGACURE® 127, IRGACURE® 184, IRGACURE® 184D, IRGACURE® 2022, IRGACURE® 2100, IRGACURE® 250, IRGACURE® 270, IRGACURE® 2959, IRGACURE® 369, IRGACURE® 369 EG, IRGACURE® 379, IRGACURE® 500, IRGACURE® 651, IRGACURE® 754, IRGACURE® 784, IRGACURE® 819, IRGACURE® 819Dw, IRGACURE® 907, IRGACURE® 907 FF, IRGACURE® Oxe01, IRGACURE® TPO-L, IRGACURE® 1173, IRGACURE® 1173D, IRGACURE® 4265, IRGACURE® BP, or IRGACURE® MBF (BASF Corporation, Wyandotte, Mich.). In some embodiments, the photoinitiator is TPO (2,4,6-trimethylbenzoyl-diphenyl-phosphine oxide) or MBF (methyl benzoylformate).

In some embodiments, the organic resin comprises, as a weight percent of the quantum dot composition (weight/weight), between about 50% and 99%, about 50% and about 95%, about 50% and about 90%, about 50% and about 80%, about 50% and about 70%, about 50% and about 60%, about 60% and about 99%, about 60% and about 95%, about 60% and about 90%, about 60% and about 80%, about 60% and about 70%, about 70% and about 99%, about 70% and about 95%, about 70% and about 90%, about 70% and about 80%, about 80% and about 99%, about 80% and about 95%, about 80% and about 90%, about 90% and about 99%, about 90% and about 95%, or about 95% and about 99%.

In some embodiments, the organic resin comprises as a weight percent of the quantum dot molded article (weight/weight) between about 50% and 99%, about 50% and about 95%, about 50% and about 90%, about 50% and about 80%, about 50% and about 70%, about 50% and about 60%, about 60% and about 99%, about 60% and about 95%, about 60% and about 90%, about 60% and about 80%, about 60% and about 70%, about 70% and about 99%, about 70% and about 95%, about 70% and about 90%, about 70% and about 80%, about 80% and about 99%, about 80% and about 95%, about 80% and about 90%, about 90% and about 99%, about 90% and about 95%, or about 95% and about 99%.

Making the Quantum Dot Compositions

The present invention provides a method of making a quantum dot composition comprising admixing at least one population of quantum dots and at least one aminosilicone polymer, optionally at least one epoxy-functional silicone, and optionally at least one organic resin.

The present invention provides a method of preparing a quantum dot composition, the method comprising:
 (a) admixing a composition comprising at least one population of quantum dots and at least one aminosilicone;
 (b) admixing at least one epoxy-functional silicone with the composition of (a); and
 (c) admixing at least one organic resin with the composition of (b).

The present invention provides a method of preparing a quantum dot composition, the method comprising:
 (a) providing a composition comprising at least one population of quantum dots, at least one aminosilicone, and at least one organic resin; and
 (b) admixing at least one epoxy-functional silicone with the composition of (a).

In some embodiments, the at least one population of quantum dots is stored in at least one aminosilicone polymer. In some embodiments, one population of quantum dots is stored in one aminosilicone polymer.

The aminosilicone polymer provides increased stability to the population of quantum dots and allows for storage of the quantum dots for extended periods of time. In some embodiments, the population of quantum dots can be stored in an aminosilicone polymer for between 1 minute and 3 years, between 1 minute and 12 months, between 1 minute and 6 months, between 1 minute and 3 months, between 1 minute and 1 month, between 1 minute and 15 days, between 1 minute and 1 day, between 1 day and 3 years, between 1 day and 12 months, between 1 day and 6 months, between 1 day and 3 months, between 1 day and 1 month, between 1 day and 15 days, between 15 days and 3 years, between 15 days and 12 months, between 15 days and 6 months, between 15 days and 3 months, between 15 days and 1 month, between 1 month and 3 years, between 1 month and 12 months, between 1 month and 6 months, between 1 month and 3 months, between 3 months and 3 years, between 3 months and 12 months, between 3 months and 6 months, between 6 months and 3 years, between 6 months and 12 months, or between 12 months and 3 years.

In some embodiments, if more than one population of quantum dots is used, the at least one first population of quantum dots stored in at least one first aminosilicone polymer is added to at least one second population of quantum dots stored in at least one first aminosilicone polymer. In some embodiments, the first and second aminosilicone polymers are the same. In some embodiments, the first and second aminosilicone polymers are different.

In some embodiments, a first population of quantum dots in an aminosilicone polymer is mixed with a second population of quantum dots in an aminosilicone polymer at an agitation rate of between 100 rpm and 10,000 rpm, between 100 rpm and 5,000 rpm, between 100 rpm and 3,000 rpm, between 100 rpm and 1,000 rpm, between 100 rpm and 500 rpm, between 500 rpm and 10,000 rpm, between 500 rpm and 5,000 rpm, between 500 rpm and 3,000 rpm, between 500 rpm and 1,000 rpm, between 1,000 rpm and 10,000 rpm, between 1,000 rpm and 5,000 rpm, between 1,000 rpm and 3,000 rpm, between 3,000 rpm and 10,000 rpm, between 3,000 rpm and 10,000 rpm, and between 5,000 rpm and 10,000 rpm.

In some embodiments, a first population of quantum dots in an aminosilicone polymer is mixed with a second population of quantum dots in an aminosilicone polymer for a time of between 10 minutes and 24 hours, between 10 minutes and 20 hours, between 10 minutes and 15 hours, between 10 minutes and 10 hours, between 10 minutes and 5 hours, between 10 minutes and 1 hour, between 10 minutes and 30 minutes, between 30 minutes and 24 hours, between 30 minutes and 20 hours, between 30 minutes and 15 hours, between 30 minutes and 10 hours, between 30 minutes and 5 hours, between 30 minutes and 1 hour, between 1 hour and 24 hours, between 1 hour and 20 hours, between 1 hour and 15 hours, between 1 hour and 10 hours, between 1 hour and 5 hours, between 5 hours and 24 hours, between 5 hours and 20 hours, between 5 hours and 15 hours, between 5 hours and 10 hours, between 10 hours and 24 hours, between 10 hours and 20 hours, between 10 hours and 15 hours, between 15 hours and 24 hours, between 15 hours and 20 hours, or between 20 hours and 24 hours.

In some embodiments, at least one epoxy-functional silicone is added to the at least one population of quantum dots and the at least one aminosilicone. In some embodiments, the amino functional groups of the aminosilicone polymer will cross-link with the epoxy functional groups of the epoxy-functional silicone. The cross-linking reaction can take between 1 hour and 10 days and can be accelerated by heating.

In some embodiments, the at least one population of quantum dots in at least one aminosilicone polymer is mixed with at least one epoxy-functional silicone at an agitation rate of between 100 rpm and 10,000 rpm, between 100 rpm and 5,000 rpm, between 100 rpm and 3,000 rpm, between 100 rpm and 1,000 rpm, between 100 rpm and 500 rpm, between 500 rpm and 10,000 rpm, between 500 rpm and 5,000 rpm, between 500 rpm and 3,000 rpm, between 500 rpm and 1,000 rpm, between 1,000 rpm and 10,000 rpm, between 1,000 rpm and 5,000 rpm, between 1,000 rpm and 3,000 rpm, between 3,000 rpm and 10,000 rpm, between 3,000 rpm and 10,000 rpm, and between 5,000 rpm and 10,000 rpm.

In some embodiments, the at least one population of quantum dots in at least one aminosilicone polymer is mixed with at least one epoxy-functional silicone for a time of between 10 minutes and 24 hours, between 10 minutes and 20 hours, between 10 minutes and 15 hours, between 10 minutes and 10 hours, between 10 minutes and 5 hours, between 10 minutes and 1 hour, between 10 minutes and 30 minutes, between 30 minutes and 24 hours, between 30 minutes and 20 hours, between 30 minutes and 15 hours, between 30 minutes and 10 hours, between 30 minutes and 5 hours, between 30 minutes and 1 hour, between 1 hour and 24 hours, between 1 hour and 20 hours, between 1 hour and 15 hours, between 1 hour and 10 hours, between 1 hour and 5 hours, between 5 hours and 24 hours, between 5 hours and 20 hours, between 5 hours and 15 hours, between 5 hours and 10 hours, between 10 hours and 24 hours, between 10 hours and 20 hours, between 10 hours and 15 hours, between 15 hours and 24 hours, between 15 hours and 20 hours, or between 20 hours and 24 hours.

In some embodiments, if more than one organic resin is used, the organic resins are added together and mixed. In some embodiments, a first organic resin is mixed with a second organic resin at an agitation rate of between 100 rpm and 10,000 rpm, between 100 rpm and 5,000 rpm, between 100 rpm and 3,000 rpm, between 100 rpm and 1,000 rpm, between 100 rpm and 500 rpm, between 500 rpm and 10,000 rpm, between 500 rpm and 5,000 rpm, between 500 rpm and 3,000 rpm, between 500 rpm and 1,000 rpm, between 1,000 rpm and 10,000 rpm, between 1,000 rpm and 5,000 rpm, between 1,000 rpm and 3,000 rpm, between 3,000 rpm and 10,000 rpm, between 3,000 rpm and 10,000 rpm, and between 5,000 rpm and 10,000 rpm. In some embodiments, the mixture further comprises at least one solvent.

In some embodiments, a first organic resin is mixed with a second organic resin for a time of between 10 minutes and 24 hours, between 10 minutes and 20 hours, between 10 minutes and 15 hours, between 10 minutes and 10 hours, between 10 minutes and 5 hours, between 10 minutes and 1 hour, between 10 minutes and 30 minutes, between 30 minutes and 24 hours, between 30 minutes and 20 hours, between 30 minutes and 15 hours, between 30 minutes and 10 hours, between 30 minutes and 5 hours, between 30 minutes and 1 hour, between 1 hour and 24 hours, between 1 hour and 20 hours, between 1 hour and 15 hours, between 1 hour and 10 hours, between 1 hour and 5 hours, between 5 hours and 24 hours, between 5 hours and 20 hours, between 5 hours and 15 hours, between 5 hours and 10 hours, between 10 hours and 24 hours, between 10 hours and 20 hours, between 10 hours and 15 hours, between 15 hours and 24 hours, between 15 hours and 20 hours, or between 20 hours and 24 hours.

In some embodiments, the composition comprising at least one population of quantum dots, at least aminosilicone polymer, and at least one epoxy-functional silicone is mixed with the at least one organic resin at an agitation rate of between 100 rpm and 10,000 rpm, between 100 rpm and 5,000 rpm, between 100 rpm and 3,000 rpm, between 100 rpm and 1,000 rpm, between 100 rpm and 500 rpm, between 500 rpm and 10,000 rpm, between 500 rpm and 5,000 rpm, between 500 rpm and 3,000 rpm, between 500 rpm and 1,000 rpm, between 1,000 rpm and 10,000 rpm, between 1,000 rpm and 5,000 rpm, between 1,000 rpm and 3,000 rpm, between 3,000 rpm and 10,000 rpm, between 3,000 rpm and 10,000 rpm, and between 5,000 rpm and 10,000 rpm. In some embodiments, the mixture further comprises at least one solvent.

In some embodiments, the composition comprising at least one population of quantum dots, at least aminosilicone polymer, and at least one epoxy-functional silicone is mixed with the at least one organic resin for a time of between 10 minutes and 24 hours, between 10 minutes and 20 hours, between 10 minutes and 15 hours, between 10 minutes and 10 hours, between 10 minutes and 5 hours, between 10 minutes and 1 hour, between 10 minutes and 30 minutes, between 30 minutes and 24 hours, between 30 minutes and 20 hours, between 30 minutes and 15 hours, between 30 minutes and 10 hours, between 30 minutes and 5 hours, between 30 minutes and 1 hour, between 1 hour and 24 hours, between 1 hour and 20 hours, between 1 hour and 15 hours, between 1 hour and 10 hours, between 1 hour and 5 hours, between 5 hours and 24 hours, between 5 hours and 20 hours, between 5 hours and 15 hours, between 5 hours and 10 hours, between 10 hours and 24 hours, between 10 hours and 20 hours, between 10 hours and 15 hours, between 15 hours and 24 hours, between 15 hours and 20 hours, or between 20 hours and 24 hours.

In some embodiments, at least one population of quantum dots, at least one aminosilicone polymer, and at least one organic resin are mixed. In some embodiments, the organic resin does not react with the aminosilicone polymer and the mixture can be stored for extended lengths of time.

In some embodiments, the composition comprising at least one population of quantum dots, at least one aminosilicone polymer, and at least one organic resin can be stored for between 1 minute and 3 years, between 1 minute and 12 months, between 1 minute and 6 months, between 1 minute and 3 months, between 1 minute and 1 month, between 1 minute and 15 days, between 1 minute and 1 day, between 1 day and 3 years, between 1 day and 12 months, between 1 day and 6 months, between 1 day and 3 months, between 1 day and 1 month, between 1 day and 15 days, between 15 days and 3 years, between 15 days and 12 months, between 15 days and 6 months, between 15 days and 3 months, between 15 days and 1 month, between 1 month and 3 years, between 1 month and 12 months, between 1 month and 6 months, between 1 month and 3 months, between 3 months and 3 years, between 3 months and 12 months, between 3 months and 6 months, between 6 months and 3 years, between 6 months and 12 months, or between 12 months and 3 years before further use.

In some embodiments, the composition comprising at least one population of quantum dots, at least one aminosilicone, and at least one organic resin is mixed with an epoxy-functional silicone at an agitation rate of between 100 rpm and 10,000 rpm, between 100 rpm and 5,000 rpm, between 100 rpm and 3,000 rpm, between 100 rpm and 1,000 rpm, between 100 rpm and 500 rpm, between 500 rpm and 10,000 rpm, between 500 rpm and 5,000 rpm, between 500 rpm and 3,000 rpm, between 500 rpm and 1,000 rpm, between 1,000 rpm and 10,000 rpm, between 1,000 rpm and 5,000 rpm, between 1,000 rpm and 3,000 rpm, between 3,000 rpm and 10,000 rpm, between 3,000 rpm and 10,000 rpm, and between 5,000 rpm and 10,000 rpm. In some embodiments, the composition further comprises at least one solvent.

In some embodiments, the composition comprising at least one population of quantum dots, at least one aminosilicone, and at least one organic resin is mixed with an epoxy-functional silicone for a time of between 10 minutes and 24 hours, between 10 minutes and 20 hours, between 10 minutes and 15 hours, between 10 minutes and 10 hours, between 10 minutes and 5 hours, between 10 minutes and 1 hour, between 10 minutes and 30 minutes, between 30 minutes and 24 hours, between 30 minutes and 20 hours, between 30 minutes and 15 hours, between 30 minutes and 10 hours, between 30 minutes and 5 hours, between 30 minutes and 1 hour, between 1 hour and 24 hours, between 1 hour and 20 hours, between 1 hour and 15 hours, between 1 hour and 10 hours, between 1 hour and 5 hours, between 5 hours and 24 hours, between 5 hours and 20 hours, between 5 hours and 15 hours, between 5 hours and 10 hours, between 10 hours and 24 hours, between 10 hours and 20 hours, between 10 hours and 15 hours, between 15 hours and 24 hours, between 15 hours and 20 hours, or between 20 hours and 24 hours.

In some embodiments, a thermal initiator or a photoinitiator can be added to the quantum dot composition to facilitate curing.

Cross-Linking Reaction

In some embodiments, the amino functional groups of the aminosilicone polymer will cross-link with the epoxy functional groups of the epoxy-functional silicone. As the amine functional groups and the epoxy functional groups cross-link, the viscosity of the composition will increase.

In some embodiments, the amine groups of the aminosilicone polymer cross-link with the epoxy groups of the epoxy-functional silicone and create gelled domains within the larger ungelled resin. This transforms the emulsified aminosilicone droplets into dispersed, lightly cross-linked gels which no longer have liquid properties and are no longer able to coagulate with one another.

In some embodiments, a quantum dot composition comprising an aminosilicone polymer is reacted with an epoxy-functional silicone at an agitation rate of between 100 rpm and 10,000 rpm, between 100 rpm and 5,000 rpm, between 100 rpm and 3,000 rpm, between 100 rpm and 1,000 rpm, between 100 rpm and 500 rpm, between 500 rpm and 10,000 rpm, between 500 rpm and 5,000 rpm, between 500 rpm and 3,000 rpm, between 500 rpm and 1,000 rpm, between 1,000 rpm and 10,000 rpm, between 1,000 rpm and 5,000 rpm, between 1,000 rpm and 3,000 rpm, between 3,000 rpm and 10,000 rpm, and between 5,000 rpm and 10,000 rpm. In some embodiments, the quantum dot composition further comprises an organic resin. In some embodiments, the quantum dot composition further comprises an organic resin and at least one solvent.

In some embodiments, a quantum dot composition comprising an aminosilicone polymer is reacted with an epoxy-functional silicone at a temperature of between 20° C. and 300° C., between 20° C. and 250° C., between 20° C. and 200° C., between 20° C. and 150° C., between 20° C. and 100° C., between 20° C. and 50° C., between 50° C. and 300° C., between 50° C. and 250° C., between 50° C. and 200° C., between 50° C. and 150° C., between 50° C. and 100° C., between 100° C. and 300° C., between 100° C. and 250° C., between 100° C. and 200° C., between 100° C. and 150° C., between 150° C. and 300° C., between 150° C. and 250° C., between 150° C. and 200° C., between 200° C. and 300° C., between 200° C. and 250° C., or between 250° C. and 300° C. In some embodiments, the quantum dot composition further comprises an organic resin. In some embodiments, the quantum dot composition further comprises an organic resin and at least one solvent.

In some embodiments, a quantum dot composition comprising an aminosilicone polymer is reacted with an epoxy-functional silicone for a time of between 10 minutes and 10 days, between 10 minutes and 5 days, between 10 minutes and 24 hours, between 10 minutes and 20 hours, between 10 minutes and 15 hours, between 10 minutes and 10 hours, between 10 minutes and 5 hours, between 10 minutes and 1 hour, between 10 minutes and 30 minutes, between 30 minutes and 10 days, between 30 minutes and 5 days, between 30 minutes and 24 hours, between 30 minutes and 20 hours, between 30 minutes and 15 hours, between 30 minutes and 10 hours, between 30 minutes and 5 hours, between 30 minutes and 1 hour, between 1 hour and 10 days, between 1 hour and 5 days, between 1 hour and 24 hours, between 1 hour and 20 hours, between 1 hour and 15 hours, between 1 hour and 10 hours, between 1 hour and 5 hours, between 5 hours and 10 days, between 5 hours and 5 days, between 5 hours and 24 hours, between 5 hours and 20 hours, between 5 hours and 15 hours, between 5 hours and 10 hours, between 10 hours and 10 days, between 10 hours and 5 days, between 10 hours and 24 hours, between 10 hours and 20 hours, between 10 hours and 15 hours, between 15 hours and 10 days, between 15 hours and 5 days, between 15 hours and 24 hours, between 15 hours and 20 hours, between 20 hours and 10 days, between 20 hours and 5 days, between 20 hours and 24 hours, between 24 hours and 10 days, between 24 hours and 5 days, or between 5 days and 10 days.

In some embodiments, the epoxy-functional silicone can be present in an amount that is more than, about the same as, or less than (weight/weight) the aminosilicone polymer. In some embodiments, the weight ratio of epoxy-functional silicone to aminosilicone polymer is about 200:1 to about 1:200, about 200:1 to about 1:100, about 200:1 to about 1:50, about 200:1 to about 1:10, about 200:1 to about 1:5, about 200:1 to about 1:1, about 100:1 to about 1:200, about 100:1 to about 1:100, about 100:1 to about 1:50, about 100:1 to about 1:10, about 100:1 to about 1:5, about 100:1 to about 1:1, about 50:1 to about 1:200, about 50:1 to about 1:100, about 50:1 to about 1:50, about 50:1 to about 1:10, about 50:1 to about 1:5, about 50:1 to about 1:1, about 10:1 to about 1:200, about 10:1 to about 1:100, about 10:1 to about 1:50, about 10:1 to about 1:10, about 10:1 to about 1:5, about 10:1 to about 1:1, about 5:1 to about 1:200, about 5:1 to about 1:100, about 5:1 to about 1:50, about 5:1 to about 1:10, about 1:1 to about 1:200, about 1:1 to about 1:100, about 1:1 to about 1:50, about 1:1 to about 1:10, about 1:1 to about 1:5. In some embodiments, the weight ratio of epoxy-functional silicone to aminosilicone polymer is about 1000:1, about 500:1, about 200:1, about 100:1, about 50:1, about 10:1, about 1:1, about 1:10, about 1:50, about 1:100, about 1:200, about 1:500, or about 1:1000.

The quantum dot compositions and quantum dot films of the present invention comprise cross-linked domains of aminosilicone polymer and epoxy-functional silicone. FIG. 1 shows a quantum dot film that contains small cross-linked domains. The cross-linked domains prevent coagulation of the aminosilicone in the compositions and films which provides improved stability for the quantum dot compositions and improved optical and mechanical properties for the quantum dot films.

In some embodiments, the cross-linked domains can have an average size of between about 0.5 and about 10 microns. In some embodiments, the cross-linked domains can have an average thickness of between about 0.5 and about 10 microns.

Making a Quantum Dot Layer

The quantum dots used in the present invention can be embedded in a polymeric matrix using any suitable method. As used herein, the term "embedded" is used to indicate that the quantum dot population is enclosed or encased with the polymer that makes up the majority of the component of the matrix. The some embodiments, the at least one quantum dot population is suitably uniformly distributed throughout the matrix. In some embodiments, the at least one quantum dot population is distributed according to an application-specific distribution. In some embodiments, the quantum dots are mixed in a polymer and applied to the surface of a substrate.

The quantum dot composition can be deposited by any suitable method known in the art, including but not limited to painting, spray coating, solvent spraying, wet coating, adhesive coating, spin coating, tape-coating, roll coating, flow coating, inkjet vapor jetting, drop casting, blade coating, mist deposition, or a combination thereof. Preferably, the quantum dot composition is cured after deposition. Suitable curing methods include photo-curing, such as UV curing, and thermal curing. Traditional laminate film processing methods, tape-coating methods, and/or roll-to-roll fabrication methods can be employed in forming the quantum dot films of the present invention. The quantum dot composition can be coated directly onto the desired layer of a substrate. Alternatively, the quantum dot composition can be formed into a solid layer as an independent element and subsequently applied to the substrate. In some embodiments, the quantum dot composition can be deposited on one or more barrier layers.

Spin Coating

In some embodiments, the quantum dot composition is deposited onto a substrate using spin coating. In spin coating a small amount of material is typically deposited onto the center of a substrate loaded a machine called the spinner which is secured by a vacuum. A high speed of rotation is applied on the substrate through the spinner which causes centripetal force to spread the material from the center to the edge of the substrate. While most of the material would be spun off, a certain amount remains of the substrate, forming a thin film of material on the surface as the rotation continues. The final thickness of the film is determined by the nature of the deposited material and the substrate in addition to the parameters chosen for the spin process such as spin speed, acceleration, and spin time. For typical films, a spin speed of 1500 to 6000 rpm is used with a spin time of 10-60 seconds.

Mist Deposition

In some embodiments, the quantum dot composition is deposited onto a substrate using mist deposition. Mist deposition takes place at room temperature and atmospheric pressure and allows precise control over film thickness by changing the process conditions. During mist deposition, a liquid source material is turned into a very fine mist and carried to the deposition chamber by nitrogen gas. The mist is then drawn to the wafer surface by a high voltage potential between the field screen and the wafer holder. Once the droplets coalesce on the wafer surface, the wafer is removed from the chamber and thermally cured to allow the solvent to evaporate. The liquid precursor is a mixture of solvent and material to be deposited. It is carried to the atomizer by pressurized nitrogen gas. Price, S. C., et al., "Formation of Ultra-Thin Quantum Dot Films by Mist Deposition," *ESC Transactions* 11:89-94 (2007).

Spray Coating

In some embodiments, the quantum dot composition is deposited onto a substrate using spray coating. The typical equipment for spray coating comprises a spray nozzle, an atomizer, a precursor solution, and a carrier gas. In the spray deposition process, a precursor solution is pulverized into micro sized drops by means of a carrier gas or by atomization (e.g., ultrasonic, air blast, or electrostatic). The droplets that come out of the atomizer are accelerated by the substrate surface through the nozzle by help of the carrier gas which is controlled and regulated as desired. Relative motion between the spray nozzle and the substrate is defined by design for the purpose of full coverage on the substrate.

In some embodiments, application of the quantum dot composition further comprises a solvent. In some embodiments, the solvent for application of the quantum dot composition is water, organic solvents, inorganic solvents, halogenated organic solvents, or mixtures thereof. Illustrative solvents include, but are not limited to, water, $D_2O$, acetone, ethanol, dioxane, ethyl acetate, methyl ethyl ketone, isopropanol, anisole, γ-butyrolactone, dimethylformamide, N-methylpyrrolidinone, dimethylacetamide, hexamethylphosphoramide, toluene, dimethylsulfoxide, cyclopentanone, tetramethylene sulfoxide, xylene, ε-caprolactone, tetrahydrofuran, tetrachloroethylene, chloroform, chlorobenzene, dichloromethane, 1,2-dichloroethane, 1,1,2,2-tetrachloroethane, or mixtures thereof.

In some embodiments, the compositions are thermally cured to form the quantum dot layer. In some embodiments, the compositions are cured using UV light. In some embodiments, the quantum dot composition is coated directly onto a barrier layer of a quantum dot film, and an additional barrier layer is subsequently deposited upon the quantum dot layer to create the quantum dot film. A support substrate can be employed beneath the barrier film for added strength, stability, and coating uniformity, and to prevent material inconsistency, air bubble formation, and wrinkling or folding of the barrier layer material or other materials. Additionally, one or more barrier layers are preferably deposited over a quantum dot layer to seal the material between the top and bottom barrier layers. Suitably, the barrier layers can be deposited as a laminate film and optionally sealed or further processed, followed by incorporation of the quantum dot film into the particular lighting device. The quantum dot composition deposition process can include additional or varied components, as will be understood by persons of ordinary skill in the art. Such embodiments will allow for in-line process adjustments of the quantum dot emission characteristics, such as brightness and color (e.g., to adjust the quantum film white point), as well as the quantum dot film thickness and other characteristics. Additionally, these embodiments will allow for periodic testing of the quantum dot film characteristics during production, as well as any necessary toggling to achieve precise quantum dot film characteristics. Such testing and adjustments can also be accomplished without changing the mechanical configuration of the processing line, as a computer program can be employed to electronically change the respective amounts of mixtures to be used in forming a quantum dot film.

Barrier Layers

In some embodiments, the quantum dot molded article comprises one or more barrier layers disposed on either one or both sides of the quantum dot layer. Suitable barrier layers protect the quantum dot layer and the quantum dot molded article from environmental conditions such as high temperatures, oxygen, and moisture. Suitable barrier materials include non-yellowing, transparent optical materials which are hydrophobic, chemically and mechanically compatible with the quantum dot molded article, exhibit photo- and chemical-stability, and can withstand high temperatures. Preferably, the one or more barrier layers are index-matched to the quantum dot molded article. In preferred embodiments, the matrix material of the quantum dot molded article and the one or more adjacent barrier layers are index-matched to have similar refractive indices, such that most of the light transmitting through the barrier layer toward the quantum dot molded article is transmitted from the barrier layer into the quantum dot layer. This index-matching reduces optical losses at the interface between the barrier and matrix materials.

The barrier layers are suitably solid materials, and can be a cured liquid, gel, or polymer. The barrier layers can comprise flexible or non-flexible materials, depending on the particular application. Barrier layers are preferably planar layers, and can include any suitable shape and surface area configuration, depending on the particular lighting application. In preferred embodiments, the one or more barrier layers will be compatible with laminate film processing techniques, whereby the quantum dot layer is disposed on at least a first barrier layer, and at least a second barrier layer is disposed on the quantum dot layer on a side opposite the quantum dot layer to form the quantum dot molded article according to one embodiment of the present invention. Suitable barrier materials include any suitable barrier materials known in the art. For example, suitable barrier materials include glasses, polymers, and oxides. Suitable barrier layer materials include, but are not limited to, polymers such as polyethylene terephthalate (PET); oxides such as silicon oxide, titanium oxide, or aluminum oxide (e.g., $SiO_2$, $Si_2O_3$, $TiO_2$, or $Al_2O_3$); and suitable combinations thereof. Preferably, each barrier layer of the quantum dot molded article comprises at least 2 layers comprising different materials or compositions, such that the multi-layered barrier eliminates or reduces pinhole defect alignment in the barrier layer, providing an effective barrier to oxygen and moisture penetration into the quantum dot layer. The quantum dot layer can include any suitable material or combination of materials and any suitable number of barrier layers on either or both sides of the quantum dot layer. The materials, thickness, and number of barrier layers will depend on the particular application, and will suitably be chosen to maximize barrier protection and brightness of the quantum dot layer while minimizing thickness of the quantum dot molded article. In preferred embodiments, each barrier layer comprises a laminate film, preferably a dual laminate film, wherein the thickness of each barrier layer is sufficiently thick to eliminate wrinkling in roll-to-roll or laminate manufacturing processes. The number or thickness of the barriers may further depend on legal toxicity guidelines in embodiments where the quantum dots comprise heavy metals or other toxic materials, which guidelines may require more or thicker barrier layers. Additional considerations for the barriers include cost, availability, and mechanical strength.

In some embodiments, the quantum dot film comprises two or more barrier layers adjacent each side of the quantum dot layer, for example, two or three layers on each side or two barrier layers on each side of the quantum dot layer. In some embodiments, each barrier layer comprises a thin glass sheet, e.g., glass sheets having a thickness of about 100 µm, 100 µm or less, 50 µm or less, preferably 50 µm or about 50 µm.

Each barrier layer of the quantum dot film of the present invention can have any suitable thickness, which will depend on the particular requirements and characteristics of the lighting device and application, as well as the individual film components such as the barrier layers and the quantum dot layer, as will be understood by persons of ordinary skill in the art. In some embodiments, each barrier layer can have a thickness of 50 µm or less, 40 µm or less, 30 µm or less, 25 µm or less, 20 µm or less, or 15 µm or less. In certain embodiments, the barrier layer comprises an oxide coating, which can comprise materials such as silicon oxide, titanium oxide, and aluminum oxide (e.g., $SiO_2$, $Si_2O_3$, $TiO_2$, or $Al_2O_3$). The oxide coating can have a thickness of about 10 µm or less, 5 µm or less, 1 µm or less, or 100 nm or less. In certain embodiments, the barrier comprises a thin oxide coating with a thickness of about 100 nm or less, 10 nm or less, 5 nm or less, or 3 nm or less. The top and/or bottom barrier can consist of the thin oxide coating, or may comprise the thin oxide coating and one or more additional material layers.

Quantum Dot Film Features and Embodiments

In certain embodiments, the quantum dot films of the present invention are used to form display devices. As used herein, a display device refers to any system with a lighting display. Such devices include, but are not limited to, devices encompassing a liquid crystal display (LCD), televisions, computers, mobile phones, smart phones, personal digital assistants (PDAs), gaming devices, electronic reading devices, digital cameras, and the like.

In some embodiments, the optical films containing nanostructure compositions are substantially free of cadmium. As used herein, the term "substantially free of cadmium" is intended that the nanostructure compositions contain less than 100 ppm by weight of cadmium. The RoHS compliance definition requires that there must be no more than 0.01% (100 ppm) by weight of cadmium in the raw homogeneous precursor materials. The cadmium concentration can be measured by inductively coupled plasma mass spectroscopy (ICP-MS) analysis, and are on the parts per billion (ppb) level. In some embodiments, optical films that are "substantially free of cadmium" contain 10 to 90 ppm cadmium. In other embodiment, optical films that are substantially free of cadmium contain less than about 50 ppm, less than about 20 ppm, less than about 10 ppm, or less than about 1 ppm of cadmium.

EXAMPLES

The following examples are illustrative and non-limiting, of the products and methods described herein. Suitable modifications and adaptations of the variety of conditions, formulations, and other parameters normally encountered in the field and which are obvious to those skilled in the art in view of this disclosure are within the spirit and scope of the invention.

Example 1

Preparation of a Cross-Linkable Quantum Dot Concentrate

An aminosilicone-based quantum dot concentrate containing green quantum dots (1.4 g) and an aminosilicone-based quantum dot concentrate containing red quantum dots (0.4 g) are mixed together for 2 minutes in a vacuum planetary mixer at 2000 rpm. To this mixture is added an epoxy-functional silicone (1.8 g) (GP-607, from Genesee Polymers, Flint, Mich.). This mixture is again mixed for 2 minutes in a vacuum planetary mixer at 2000 rpm. The resultant mixture is transferred into an atmosphere-controlled glove box and must is used in Example 3 within 2 hours.

Example 2

Preparation of a High Viscosity Resin Oligomer which does not React with Aminosilicone Glycol di-mercaptopropionate (7.5 g) (Bruno Bock, Marshacht, Germany) and Isophorone diisocyanate (2.5 g) (Sigma-Aldrich, St. Louis, Mo.) are mixed together for 2 minutes in a vacuum planetary mixer at 2000 rpm. Afterwards, triethylamine (12.5 mg) (Sigma-Aldrich, St. Louis, Mo.) is added to the mixture and the mixture is again mixed for 2 minutes in a vacuum planetary mixer at 2000 rpm. The mixture is set aside at room temperate and is complete after resting for 24 hours.

Example 3

Preparation of an In-Situ Cross-Linked Quantum Dot Emulsion

The high viscosity resin oligomer in Example 2 (4.4 g) and the cross-linkable quantum dot concentrate in Example 1 (0.4 g) are mixed together for 2 minutes in a vacuum planetary mixer at 2000 rpm. A quantum dot emulsion forms. The emulsion is set aside for 3 days during which the quantum dot emulsified domains become cross-linked. After 3 days, it may be used in the next step. No chemical reaction takes place between the resin oligomer and the cross-linkable quantum dot concentrate.

Example 4

Preparation of a Photocurable Quantum Dot-Containing Resin

The in-situ cross-linked quantum dot emulsion from Example 3 (1.6 g), pentaerythritol tetrakis(3-mercaptopropionate) (0.33 g) (Evans Chemetics), triallyl triazine trione (1.3 g) (Sartomer USA), and Irgacure® TPO-L photoinitiator (0.033 g) (BASF) are mixed together for 2 minutes in a vacuum planetar mixer at 2000 rpm.

Example 5

Preparation of a Cured Quantum-Dot-Containing Film

The photocurable quantum dot-contain resin from Example 4 is coated between two pieces of barrier film and the thickness of the coating is controlled to 100 um. The coating is then exposed to 1.6 J/cm² of UVA ultraviolet light. The film is now cured.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

All publications, patents and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

What is claimed is:

1. A quantum dot composition, comprising:
   (a) at least one population of quantum dots;
   (b) at least one aminosilicone polymer;
   (c) at least one epoxy-functional silicone; and
   (d) at least one organic resin;
   wherein the quantum dot composition comprises cross-linked domains of aminosilicone polymer and epoxy-functional silicone;
   wherein the cross-linked domains comprise gelled domains within the resin; and
   wherein the resin is not gelled.

2. The quantum dot composition of claim 1, comprising between one and five populations of quantum dots.

3. The quantum dot composition of claim 1, wherein the at least one population of quantum dots contains a core selected from the group consisting of InP, InZnP, InGaP, CdSe, CdS, CdSSe, CdZnSe, CdZnS, ZnSe, ZnSSe, InAs, InGaAs, and InAsP.

4. The quantum dot composition of claim 1, comprising between one and five aminosilicone polymers.

5. The quantum dot composition of claim 1, comprising between one and five epoxy-functional silicones.

6. The quantum dot composition of claim 1, wherein the at least one epoxy-functional silicone has the structure of formula IV:

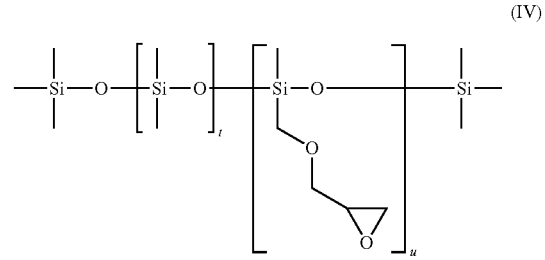

(IV)

wherein t is an integer between 0 and 700 and u is an integer between 1 and 100.

7. The quantum dot composition of claim 1, comprising between one and five organic resins.

8. The quantum dot composition of claim 1, wherein the at least one organic resin is a mercapto-functional compound.

9. The quantum dot composition of claim 1, wherein the at least one organic resin is an isocyanate, an epoxy, or an unsaturated compound.

10. The quantum dot composition of claim 1, further comprising a thermal initiator or a photoinitiator.

11. The quantum dot composition of claim 1, wherein the cross-linked domains have an average size of between about 0.5 and about 10 microns.

12. The quantum dot composition of claim 1, wherein the quantum dot composition comprises 2 populations of quantum dots, 2 aminosilicone polymers, 1 epoxy-functional silicone, and 2 organic resins.

13. A method of preparing the quantum dot composition of claim 1, the method comprising:
  (a) (i) providing a composition comprising at least one population of quantum dots and at least one aminosilicone;
    (ii) admixing at least one epoxy-functional silicone with the composition of (a)(i); and
    (iii) admixing at least one organic resin with the composition of (a)(ii); or
  (b) (i) providing a composition comprising at least one population of quantum dots, at least one aminosilicone, and at least one organic resin; and
    (ii) admixing at least one epoxy-functional silicone with the composition of (b)(i).

14. The method of claim 13, wherein the at least one population of quantum dots contains a core selected from the group consisting of InP, InZnP, InGaP, CdSe, CdS, CdSSe, CdZnSe, CdZnS, ZnSe, ZnSSe, InAs, InGaAs, and InAsP.

15. The method of claim 13, comprising between one and five aminosilicone polymers.

16. The method of claim 13, comprising between one and five epoxy-functional silicones.

17. The method of claim 13, wherein the at least one epoxy-functional silicone has the structure of formula IV:

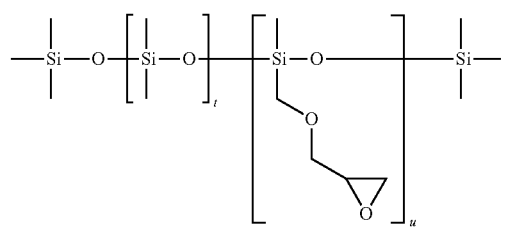

wherein t is an integer between 0 and 700 and u is an integer between 1 and 100.

18. The method of claim 13, wherein the composition of (a)(i) or (b)(i) is stored for between 1 minute and 3 years before the admixing in (a)(ii) or (b)(ii).

19. The method of claim 13, comprising two organic resins.

20. The method of claim 13, wherein the at least one organic resin is a mercapto-functional compound.

21. The method of claim 13, wherein the at least one organic resin is an isocyanate, an epoxy, or an unsaturated compound.

22. The method of claim 13, further comprising admixing at least one thermal initiator or photoinitiator with the composition of (a)(iii) or (b)(ii).

23. The method of claim 13, further comprising curing the composition of (a)(iii) or (b)(ii) using thermal curing or UV curing.

24. The composition of claim 1, wherein the cross-linked domains have an average size of between about 0.5 and about 10 microns.

25. The composition of claim 1, wherein the resin is not chemically reacted with the cross-linked domains.

* * * * *